(12) United States Patent
Ogata et al.

(10) Patent No.: US 9,108,544 B2
(45) Date of Patent: Aug. 18, 2015

(54) VEHICLE SEAT DEVICE

(75) Inventors: Yusuke Ogata, Wako (JP); Koki Sato, Wako (JP); Osamu Shirose, Wako (JP); Nobuo Yokochi, Wako (JP); Yoichi Tachikawa, Tochigi (JP)

(73) Assignees: Honda Motor Co., Ltd., Tokyo (JP); TS Tech Co., Ltd., Saitama (JP)

( * ) Notice: Subject to any disclaimer, the term of this patent is extended or adjusted under 35 U.S.C. 154(b) by 74 days.

(21) Appl. No.: 14/007,518

(22) PCT Filed: Mar. 15, 2012

(86) PCT No.: PCT/JP2012/056636
§ 371 (c)(1),
(2), (4) Date: Sep. 25, 2013

(87) PCT Pub. No.: WO2012/132916
PCT Pub. Date: Oct. 4, 2012

(65) Prior Publication Data
US 2014/0015296 A1     Jan. 16, 2014

(30) Foreign Application Priority Data

Mar. 31, 2011  (JP) ................................. 2011-078196

(51) Int. Cl.
*B60N 2/30*     (2006.01)
*B60N 2/36*     (2006.01)
*B60N 2/48*     (2006.01)

(52) U.S. Cl.
CPC .............. *B60N 2/3002* (2013.01); *B60N 2/305* (2013.01); *B60N 2/309* (2013.01); *B60N 2/3013* (2013.01);

(Continued)

(58) Field of Classification Search
CPC ........ B60N 2/10; B60N 2/3013; B60N 2/305; B60N 2/3088; B60N 2/3097; B60N 2/36; B60N 2002/363; B60N 2/366
USPC .............. 297/326, 334, 335, 336, 337, 378.1, 297/378.12; 296/65.05, 65.09, 65.16, 65.17
See application file for complete search history.

(56) References Cited

U.S. PATENT DOCUMENTS 6,070,939 A * 6/2000 Matsuo et al. ........... 297/378.12
6,155,639 A * 12/2000 Frolo ............................ 297/331

(Continued)

FOREIGN PATENT DOCUMENTS

JP    S58-59626 U    4/1983
JP    H02-117229 U   9/1990

(Continued)

OTHER PUBLICATIONS

Extended European Search Report dated Aug. 4, 2014, issued in the corresponding EP patent application 12763742.

*Primary Examiner* — Ryan Kwiecinski
(74) *Attorney, Agent, or Firm* — Carrier Blackman & Associates, P.C.; Joseph P. Carrier; Anne G. Sabourin

(57) ABSTRACT

Disclosed is a vehicle seat device configured so that the seat cushion can be suitably held at a raised position and that side links are compact. A vehicle seat device is provided with a movement mechanism (41) capable of moving the seat cushion (24) between a seating position and a stowed position. The movement mechanism is provided with: a cross member (52) provided to the seat cushion; left and right, front support brackets (53, 54) provided to the vehicle body floor (12); left and right, side links (55, 56) rotatably connected to the left and right, front support brackets and rotatably connected to the cross member; and a guide link (57) which has first guide support shafts (71*a*, *b*) rotatably provided in front of the rotation support shafts (67, 75) of the side links and which also has a second guide support shaft (71*e*) rotatably provided to the cross member.

5 Claims, 34 Drawing Sheets

(52) U.S. Cl.
CPC ............ B60N 2/3038 (2013.01); B60N 2/3065 (2013.01); B60N 2/3097 (2013.01); B60N 2/366 (2013.01); B60N 2/4858 (2013.01); B60N 2002/363 (2013.01)

(56) References Cited

U.S. PATENT DOCUMENTS

| | | | |
|---|---|---|---|
| 6,193,317 B1 * | 2/2001 | Mitschelen et al. | 297/378.1 |
| 6,196,613 B1 * | 3/2001 | Arai | 296/65.13 |
| 6,293,603 B1 * | 9/2001 | Waku et al. | 296/65.09 |
| 6,371,559 B1 * | 4/2002 | Kienzle et al. | 297/403 |
| 6,805,407 B2 * | 10/2004 | Iliscu | 297/331 |
| 2002/0113480 A1 * | 8/2002 | Senseby et al. | 297/378.1 |
| 2004/0150243 A1 * | 8/2004 | Epaud et al. | 296/65.09 |
| 2005/0253438 A1 * | 11/2005 | Lee | 297/378.1 |
| 2007/0187972 A1 * | 8/2007 | Takatsura et al. | 296/65.09 |
| 2008/0197683 A1 * | 8/2008 | Ebbeskotte et al. | 297/330 |
| 2009/0243357 A1 * | 10/2009 | Mori et al. | 297/325 |
| 2009/0256379 A1 * | 10/2009 | Yamada et al. | 296/65.08 |
| 2011/0037304 A1 * | 2/2011 | Kammerer | 297/340 |
| 2011/0049953 A1 * | 3/2011 | Champ | 297/326 |
| 2012/0098311 A1 * | 4/2012 | Kobayashi et al. | 297/331 |
| 2012/0169095 A1 * | 7/2012 | Petit et al. | 297/188.09 |
| 2014/0077536 A1 * | 3/2014 | Mather | 297/188.08 |

FOREIGN PATENT DOCUMENTS

| | | |
|---|---|---|
| JP | 2002-254965 A | 9/2002 |
| JP | 2007-191120 A | 8/2007 |
| JP | 2007-269191 A | 10/2007 |
| JP | 2011-011665 A | 1/2011 |

* cited by examiner (a)
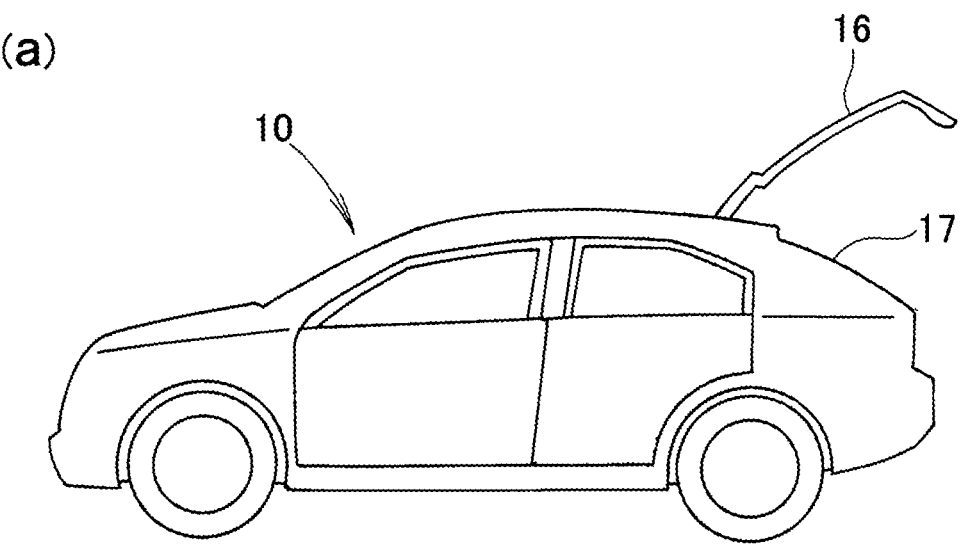
(b)
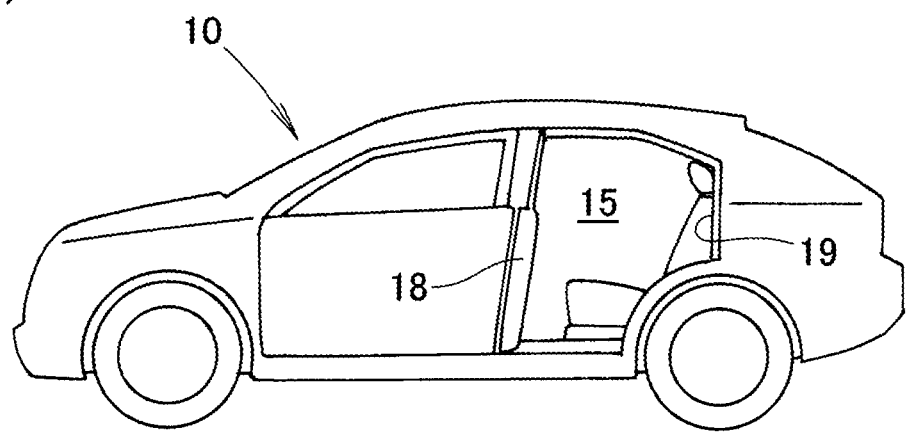
FIG.9

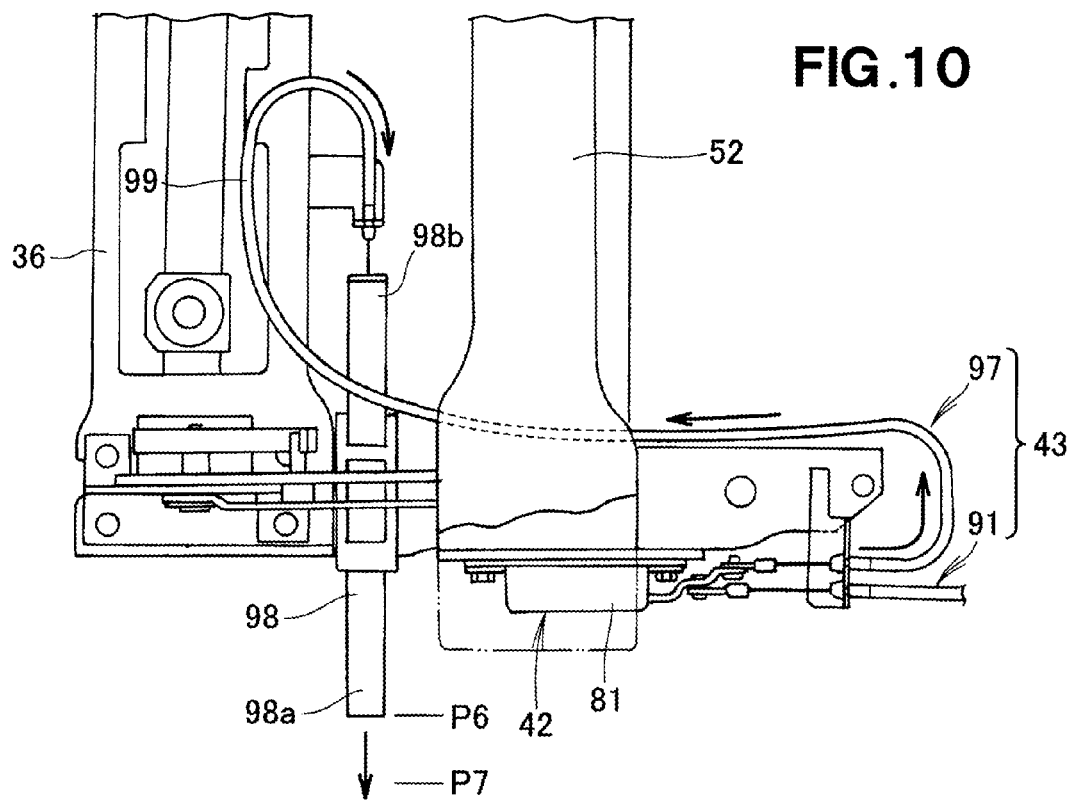
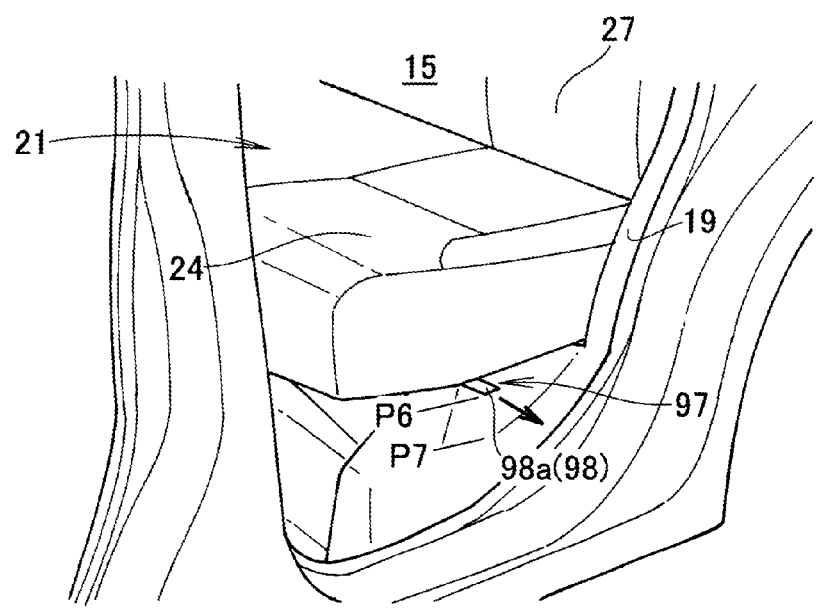
FIG. 10

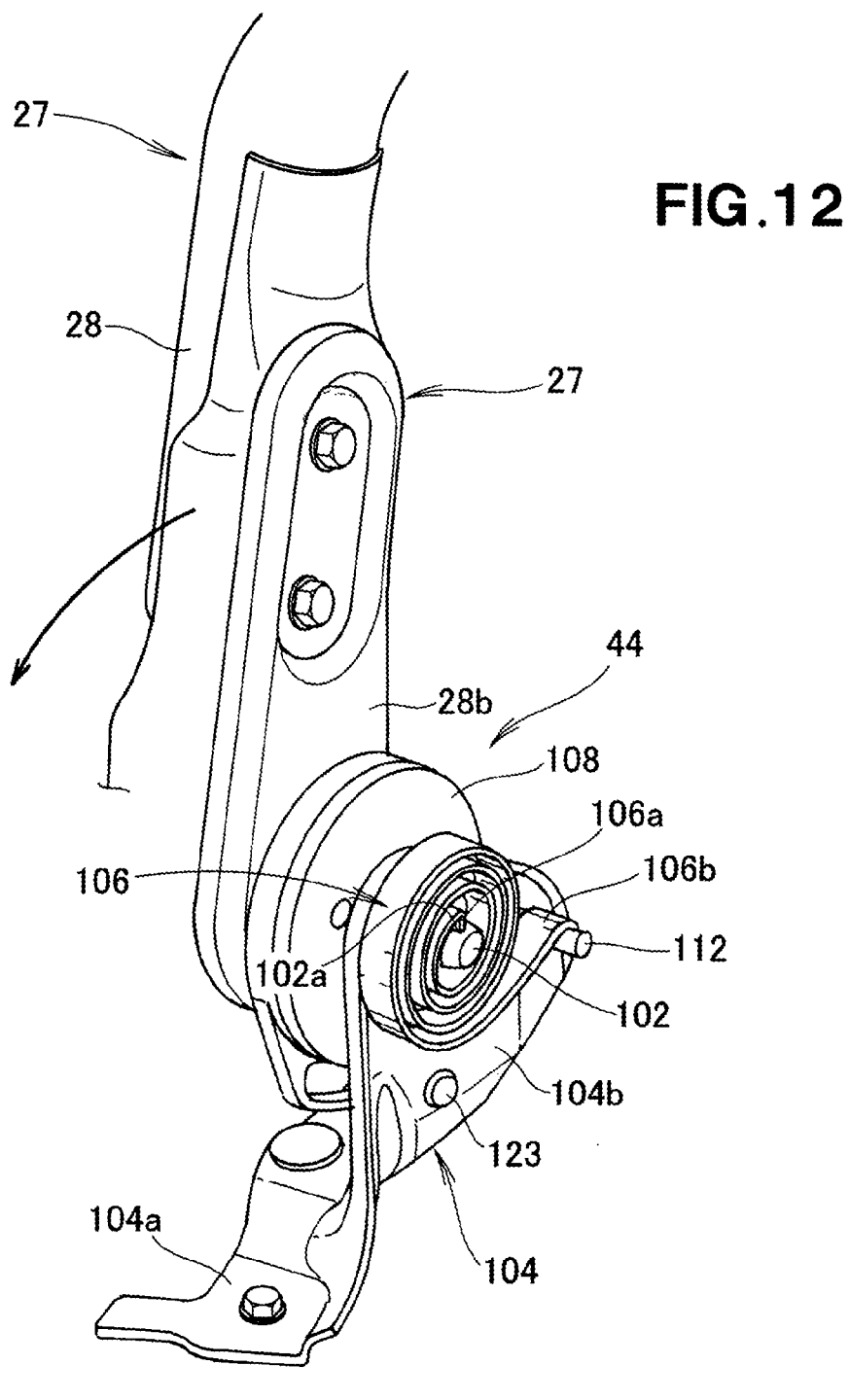
FIG.12
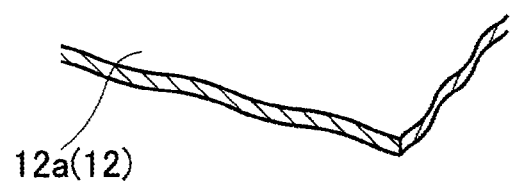

(a)
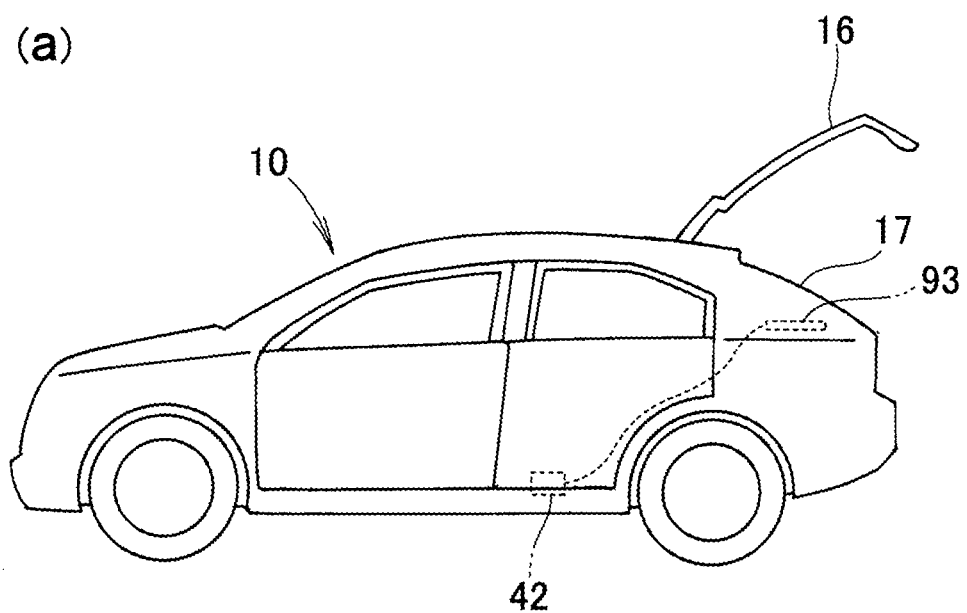
(b)
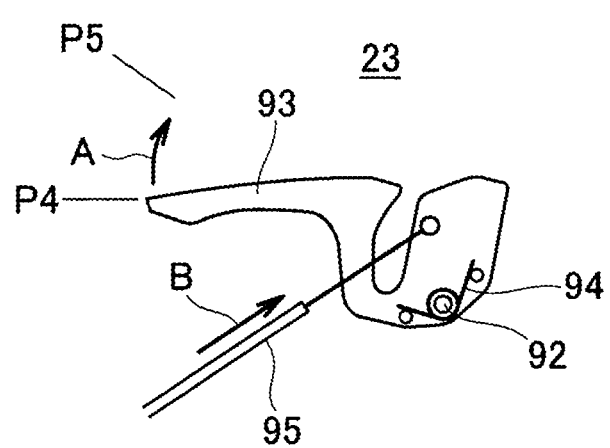
FIG.19

(a)
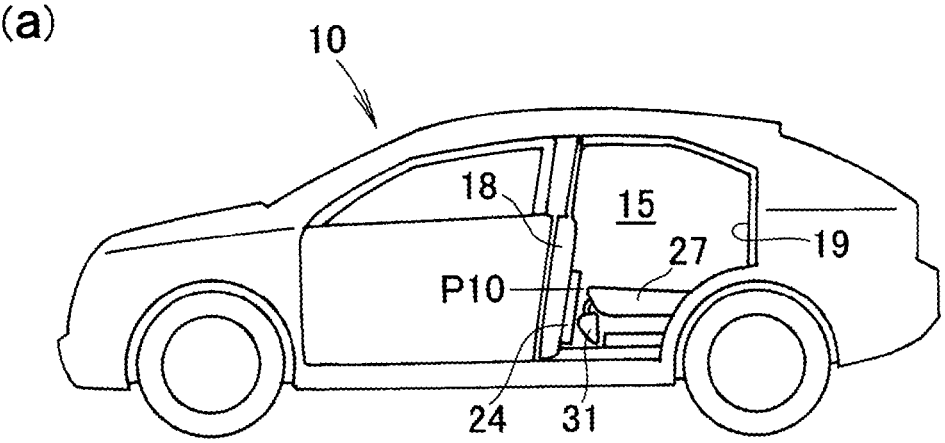
(b)
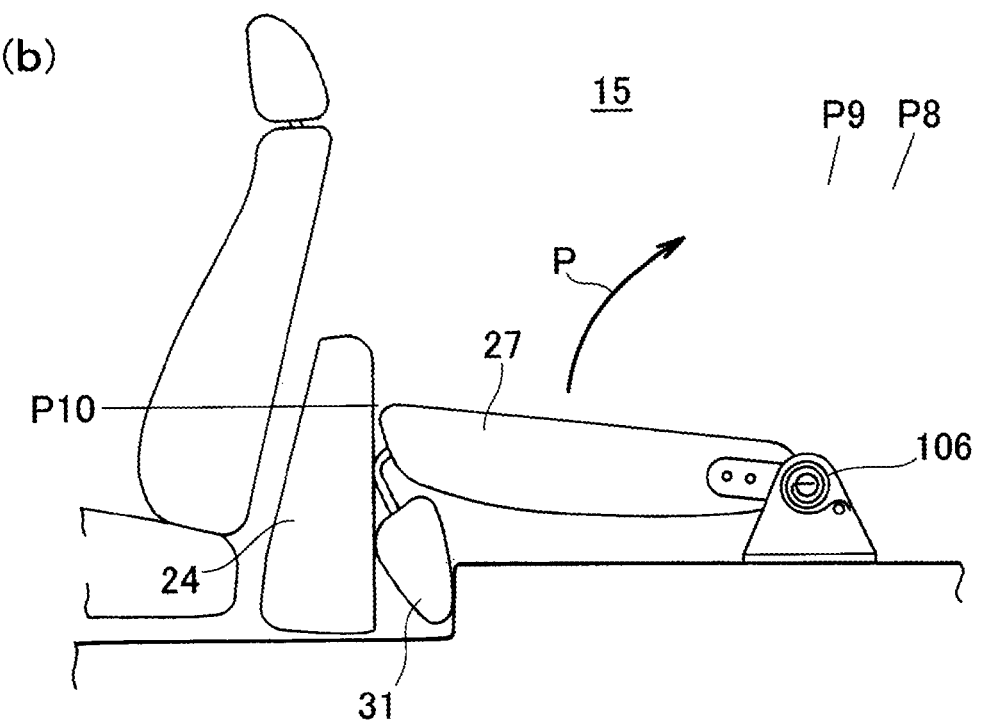
FIG. 29

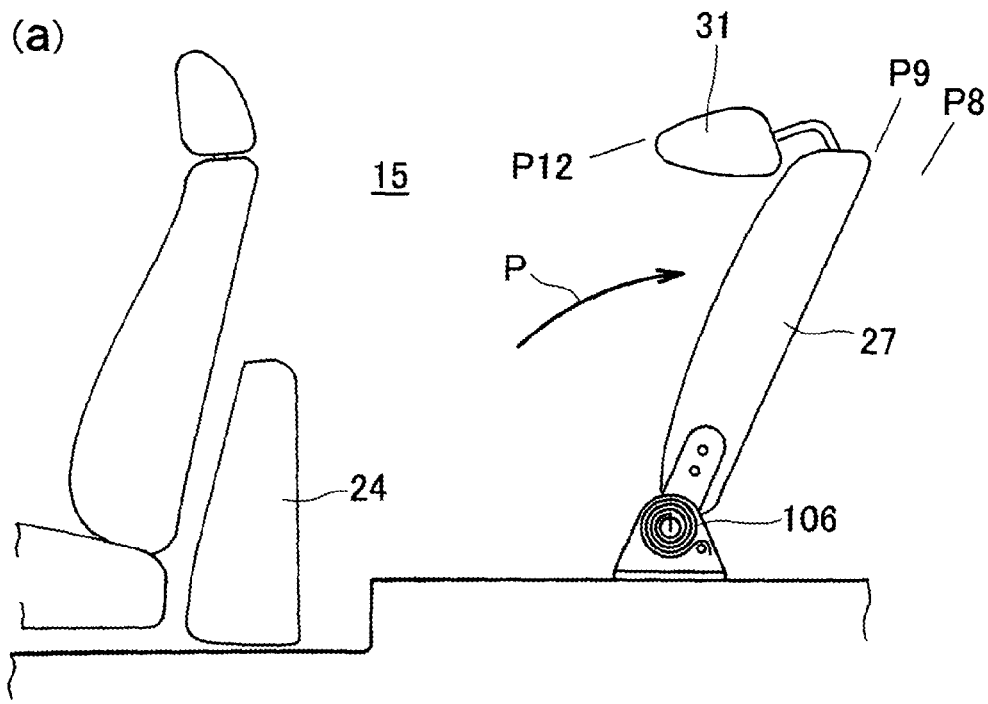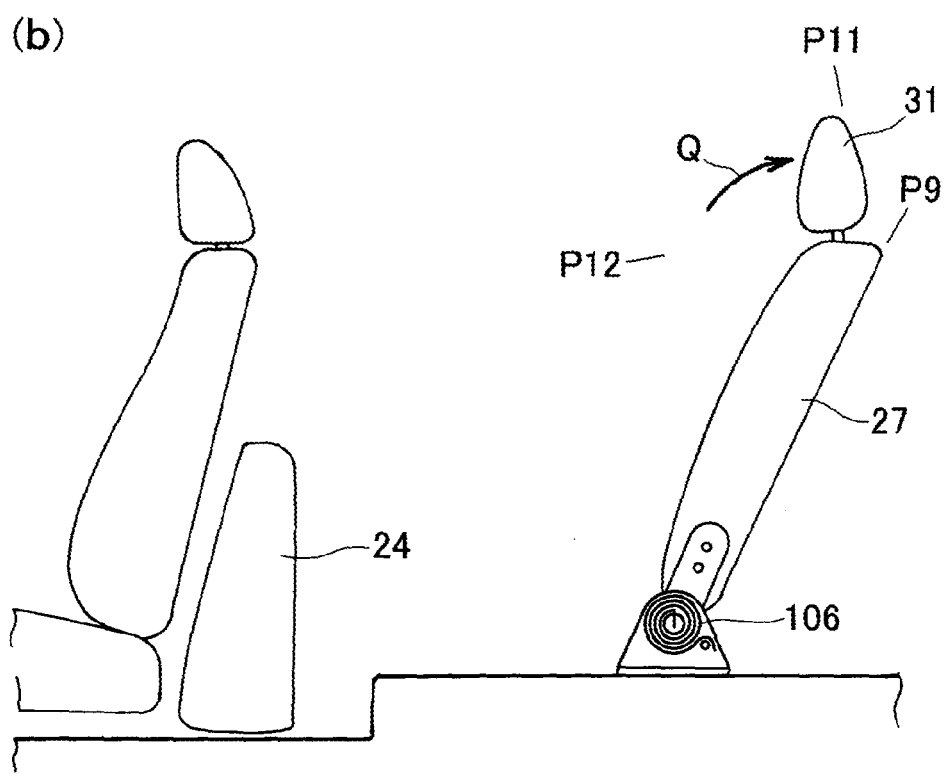
FIG.30

(a)
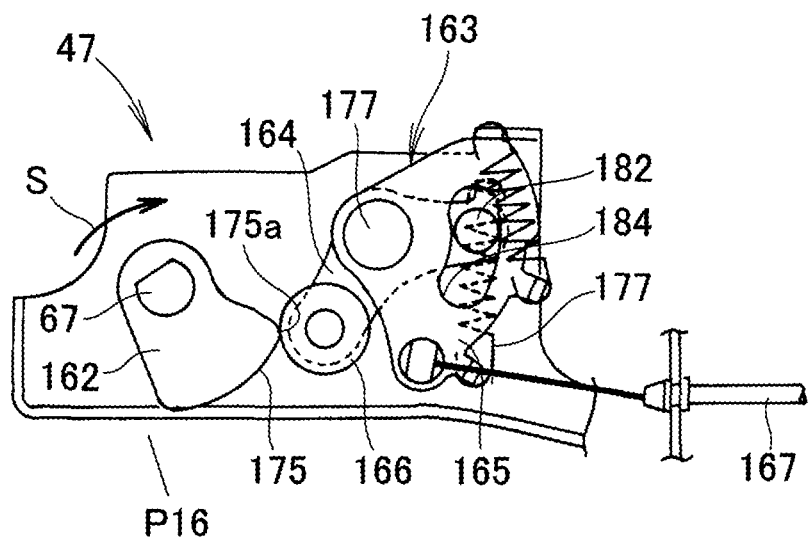
(b)
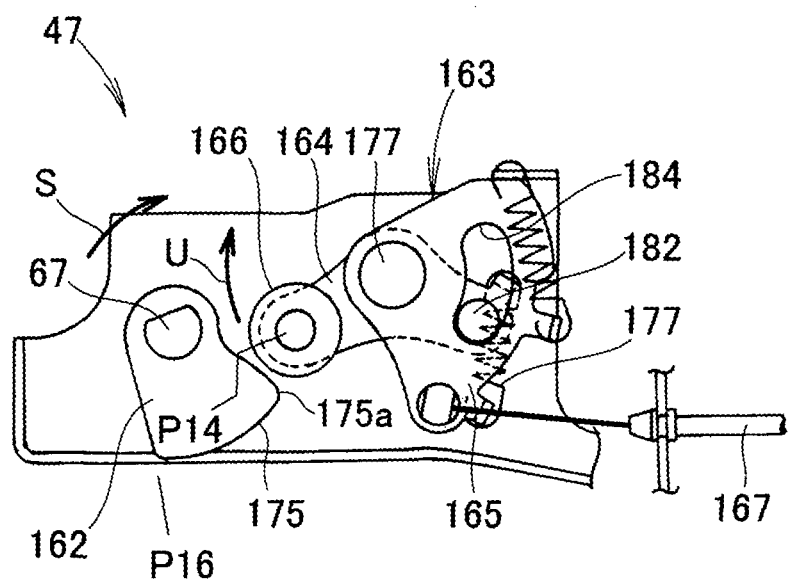
FIG.33

VEHICLE SEAT DEVICE

TECHNICAL FIELD

The present invention relates to a vehicle seat apparatus including a seat cushion movable from a seating position to a stowed position located forwardly of the seating position, and a seatback foldable forwardly from a rising position to a forward folded position.

BACKGROUND ART

A vehicle seat apparatus having a (rear) seat foldable to provide a storage space available for loading of luggage in using a vehicle for an intended purpose is well known, as disclosed in patent literature 1 below. A vehicle seat apparatus taught in patent literature 1 includes left and right side links disposed on a vehicle floor for supporting a seat cushion. The left and right side links are pivotable to turn the seat cushion forwardly.

In folding the seat apparatus, an operating system is manually manipulated to unlock the seat cushion. When the seat cushion is unlocked, the left and right side links pivot to turn the seat cushion upwardly from a seating position to a stowed position located forwardly of the seating position.

The seat cushion is turned upwardly while the seatback is unlocked to fold forwardly from an upright position to a forward folded position. With the seat cushion in the stowed position and the seatback in the forward folded position, the vehicle seat apparatus is folded. By folding the vehicle seat apparatus, a storage space for loading luggage into a luggage compartment is available.

Generally, when the seat cushion is turned upwardly from the seating position to the stowed position, it is desirable that the seat cushion hold its upwardly turned posture in a preferred manner conforming to a passenger compartment. As for the vehicle seat apparatus of patent literature 1, the left and right side links support the seat cushion. In order to hold the upwardly turned posture of the seat cushion in the preferred manner, the side links should have large sizes providing sufficiently increased rigidity. However, if the side links have such large sizes, it is difficult to provide a space for disposition of the side links. From this standpoint, there is a room to improve the vehicle seat apparatus.

PRIOR ART LITERATURE

Patent Literature

Patent Literature 1: Japanese Patent Application Laid-Open Publication No. 2007-191120

SUMMARY OF INVENTION

Technical Problem

It is an object of the present invention is to provide a vehicle seat apparatus designed to downsize side links and allow a seat cushion to hold an upwardly turned posture in a preferred manner.

Solution to Problem

According to one aspect of the present invention, there is provided a vehicle seat apparatus including a seat cushion, a movement mechanism for moving the seat cushion between a seating position and a stowed position located forwardly of the seating position, a seatback, and a forward folding mechanism for moving the seatback between a rising position and a forward folded position, wherein the movement mechanism comprises: a cross member disposed on a bottom portion of the seat cushion and extending laterally of the vehicle seat apparatus; left and right support brackets disposed forwardly of the cross member and on a vehicle body floor; left and right side links having lower end portions rotatably connected to the support brackets through rotation support shafts, and upper end portions rotatably connected to the cross member; and a guide link comprising first guide support shafts rotatably disposed forwardly of the rotation support shafts, and a second guide support shaft rotatably disposed on the cross member located rearwardly of the first guide support shafts.

Preferably, the left and right side links and the guide link vertically overlap with the seat cushion being disposed in the stowed position.

Preferably, one of the rotation support shafts is disposed on one of the left and right side links and has a first urging member for urging the seat cushion forwardly of a vehicle body.

Preferably, the guide link further comprises left and right side rods connected to the first guide support shafts, the second guide support shaft interconnects upper end portions of the left and right side rods, and the guide link has a generally U-shaped configuration opened forwardly of the vehicle body, the generally U-shaped configuration being defined by the left and right side rods and the second guide support shaft.

Preferably, the left and right side rods have lower ends rotatably supported by the support brackets.

Preferably, the apparatus further comprises a seat cushion locking mechanism for locking the seat cushion in the seating position, the seat cushion locking mechanism comprising a locking portion disposed on a side of the vehicle body floor, and a seat cushion striker engageable with the locking portion, the seat cushion striker being disposed on the cross member.

Advantageous Effects of Invention

The lower end portions of the left and right side links are rotatably connected to the support brackets through the rotation support shafts, and the upper end portions of the left and right side links are rotatably connected to the cross member. As a result, the left and right side links can support the seat cushion during upward turning of the seat cushion.

The first guide support shafts of the guide link are rotatably disposed forwardly of the rotation support shafts, and the second guide support shaft of the guide link is rotatably disposed on the cross member. As a result, when the seat cushion is turned upwardly, the guide link can hold the upwardly turned posture of the seat cushion.

Further, the left and right side links and the guide link, that is, the two types of links are provided in such a manner that the left and right side links support the seat cushion and the guide link holds the upwardly turned posture of the seat cushion. In other words, the left and right side links need not serve to hold the upwardly turned posture of the seat cushion. As a result, it becomes possible to restrain rigidity of the left and right side links, and thereby downsize the left and right side links.

Furthermore, the first guide support shafts of the guide link are rotatably disposed forwardly of the rotation support shafts. The second guide support shaft of the guide link is rotatably disposed forwardly of the cross member. When the seat cushion is turned upwardly, therefore, the guide link maintains a forwardly offset or spaced relationship to the left and right side links, thereby increasing rigidity of the movement mechanism. As a result, it becomes possible to keep rigidity of the guide link low, and thereby downsize the movement mechanism. Additionally, since the guide link is forwardly spaced from the left and right side links to increase the rigidity of the movement mechanism, the seat cushion can move along a path which is kept stable by the movement mechanism.

With the seat cushion being disposed in the stowed position, the left and right side links and the guide link overlap vertically. Since both the side links and the guide link overlap when the seat cushion is in the stowed position, the movement mechanism is difficult to view, whereby the left rear seat can be look better.

The rotation support shaft has the first urging member for urging the seat cushion forwardly of a vehicle body. Thus, the left and right side links rotate on the rotation support shafts to turn the seat cushion upwardly from the seating position to the stowed position.

The guide link has the U-shaped configuration including the left and right side rods and the second guide support shaft. Thus, the guide link can hold the upwardly turned posture of the seat cushion in a preferred manner. In other words, the left and right side links need not serve to hold the seat cushion in the upwardly turned posture. As a result, it becomes possible to restrain rigidity of the left and right side links, and thereby downsize the left and right side links.

The lower ends of the left and right side rods are rotatably supported by the support brackets. As a result, the left and right side links can support the seat cushion during upward turning of the seat cushion.

The seat cushion locking mechanism for locking the seat cushion in the seating position includes the locking portion and the seat cushion striker. The seat cushion striker is disposed on the cross member. By making locking engagement with the locking portion, the seat cushion striker can hold the seat cushion in the seating position.

BRIEF DESCRIPTION OF DRAWINGS

FIG. 9(a) is a side elevation view of a vehicle with a tail gate being opened, and FIG. 9(b) is a side elevation view of the vehicle with a left rear side door being opened;

FIG. 10(a) is a plan view of a second operation portion of the operation means of FIG. 8 and FIG. 10(b) is a perspective view of an operational strap of the second operation portion;

FIG. 12 is an enlarged view of a region 12 of FIG. 11;

FIGS. 19(a) and 19(b) are views showing that an operational lever is manipulated with a tail gate at a vehicular rear part being opened;

FIGS. 29(a) and 29(b) are views showing that the seatback is turned back with a left rear side door at a vehicular side being opened;

FIGS. 30(a) and 30(b) are views showing that a headrest shown in FIG. 29 is put into an upright position;

FIGS. 33(a) and 33(b) are views showing that the hammer member shown in FIG. 32 is returned to the hammer initial position.

DESCRIPTION OF EMBODIMENT

A certain preferred embodiment of the present invention is described below with reference to the accompanying drawings.

EMBODIMENT

Figure 1:
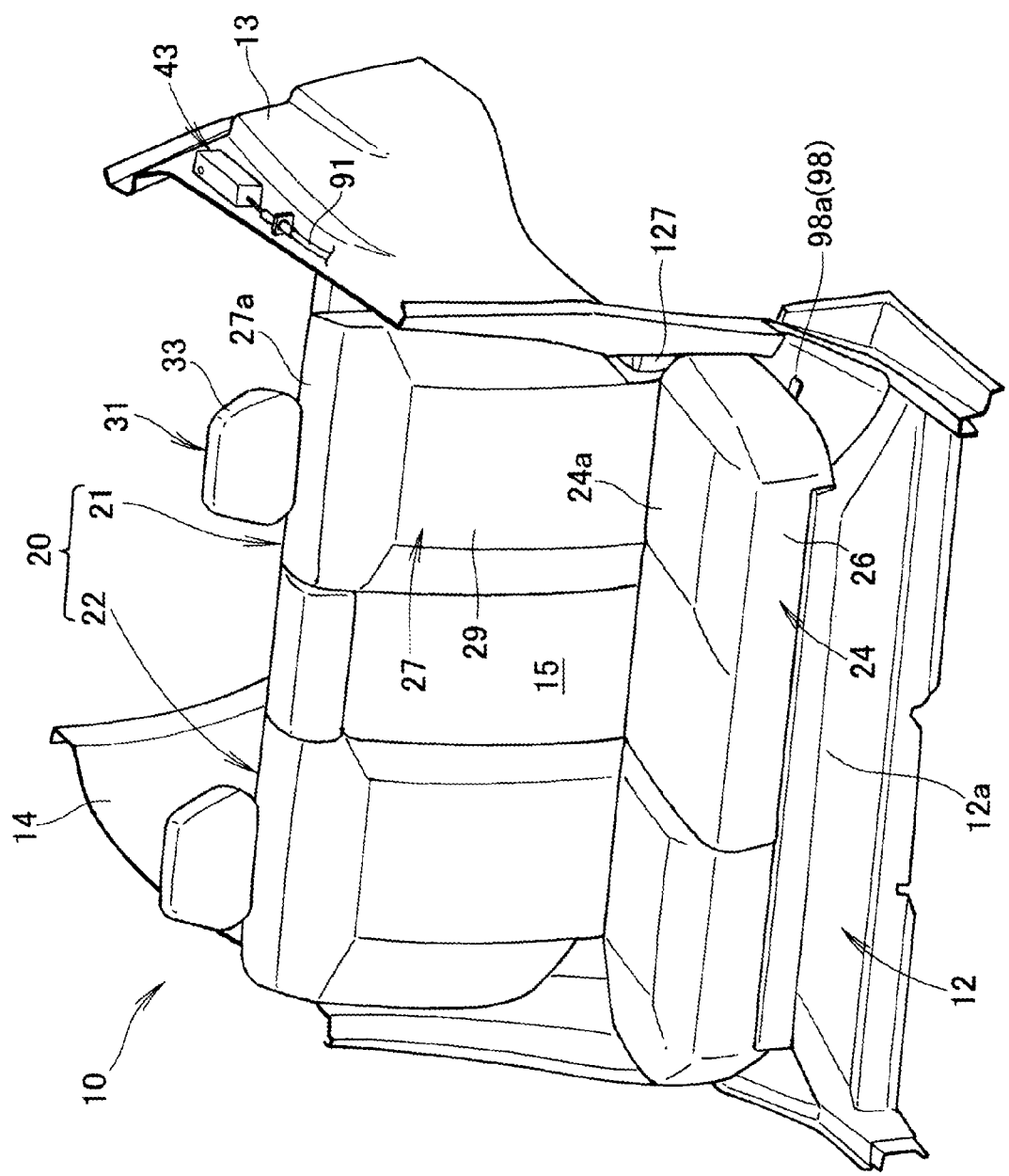
FIG. 1 is a perspective view of a rear seat including vehicle seat apparatuses in an embodiment of the present invention.

As shown in FIG. 1, a vehicle 10 includes a vehicle body floor 12 defining a floor of the vehicle 10, left and right side linings 13, 14 rising from left and right sides of the vehicle body floor 12, and a vehicle seat 20 disposed on a rear part 12a of the vehicle body floor 12. The vehicle body floor 12 and the left and right side linings 13, 14 define a passenger compartment 15.

The vehicle seat 20 includes a left rear seat 21 disposed on a substantially left half portion of the vehicle body floor 12

(the rear part 12a) and a right rear seat 22 disposed on a substantially right half portion of the vehicle body floor 12 (the rear part 12a). The right rear seat 22 has the same function as that of the left rear seat 21 and a detailed description of the right rear seat 22 will be omitted.

Figure 2:
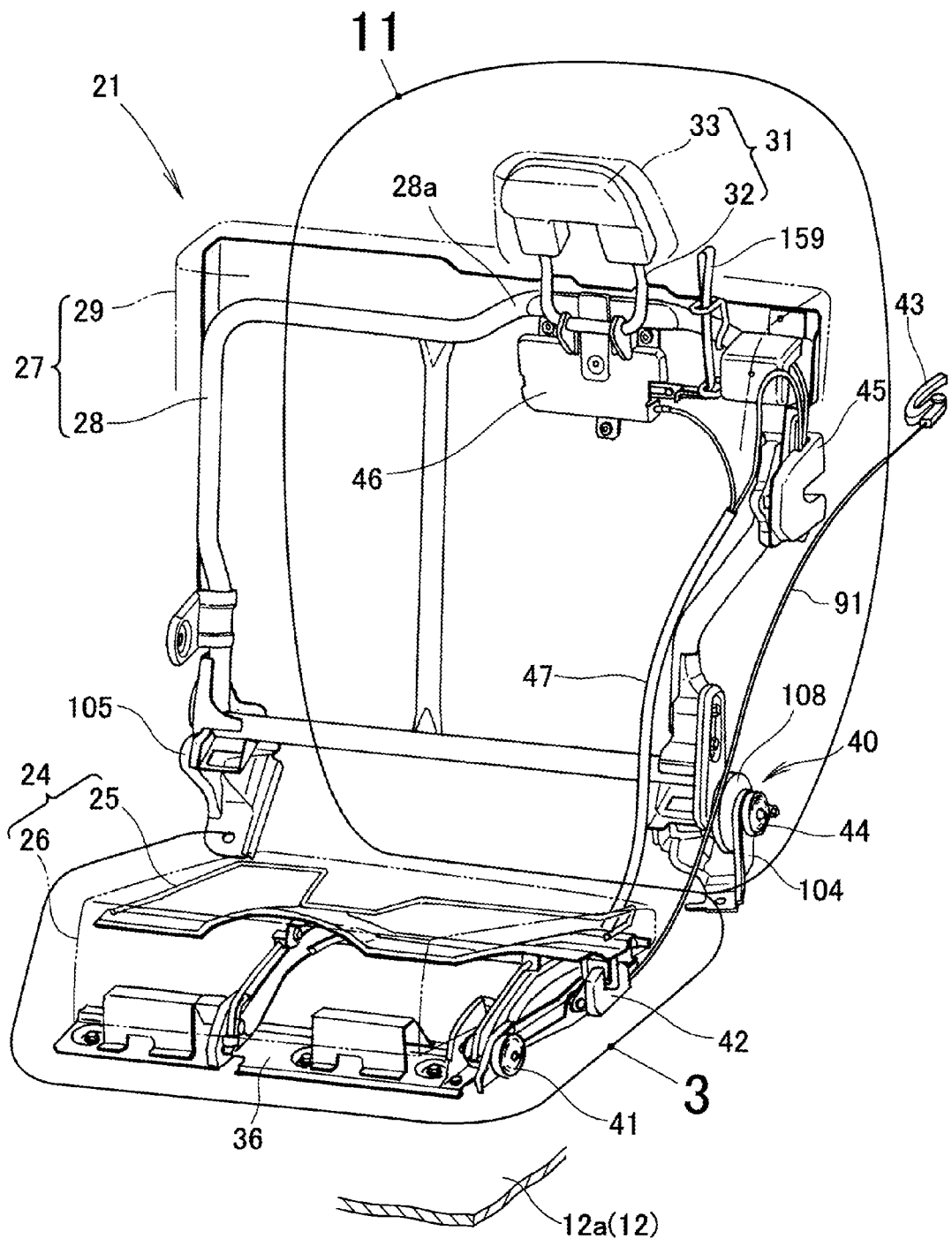
FIG. 2 is a perspective view of a left one of the vehicle seat apparatuses of FIG. 1.

As shown in FIG. 1 and FIG. 2, the left rear seat 21 includes a seat cushion 24 on which an occupant can sit, a seatback 27 disposed on a rear part 24a of the seat cushion 24, a headrest 31 disposed on a top portion 27a of the seatback 27, and a "double fall-down" structure 40 for folding the left rear seat 21. That is, the left rear seat 21 is a "double fall-down" seat designed to allow the seat cushion 24 and the seatback 27 to fold in a manner set forth later.

Figure 4:
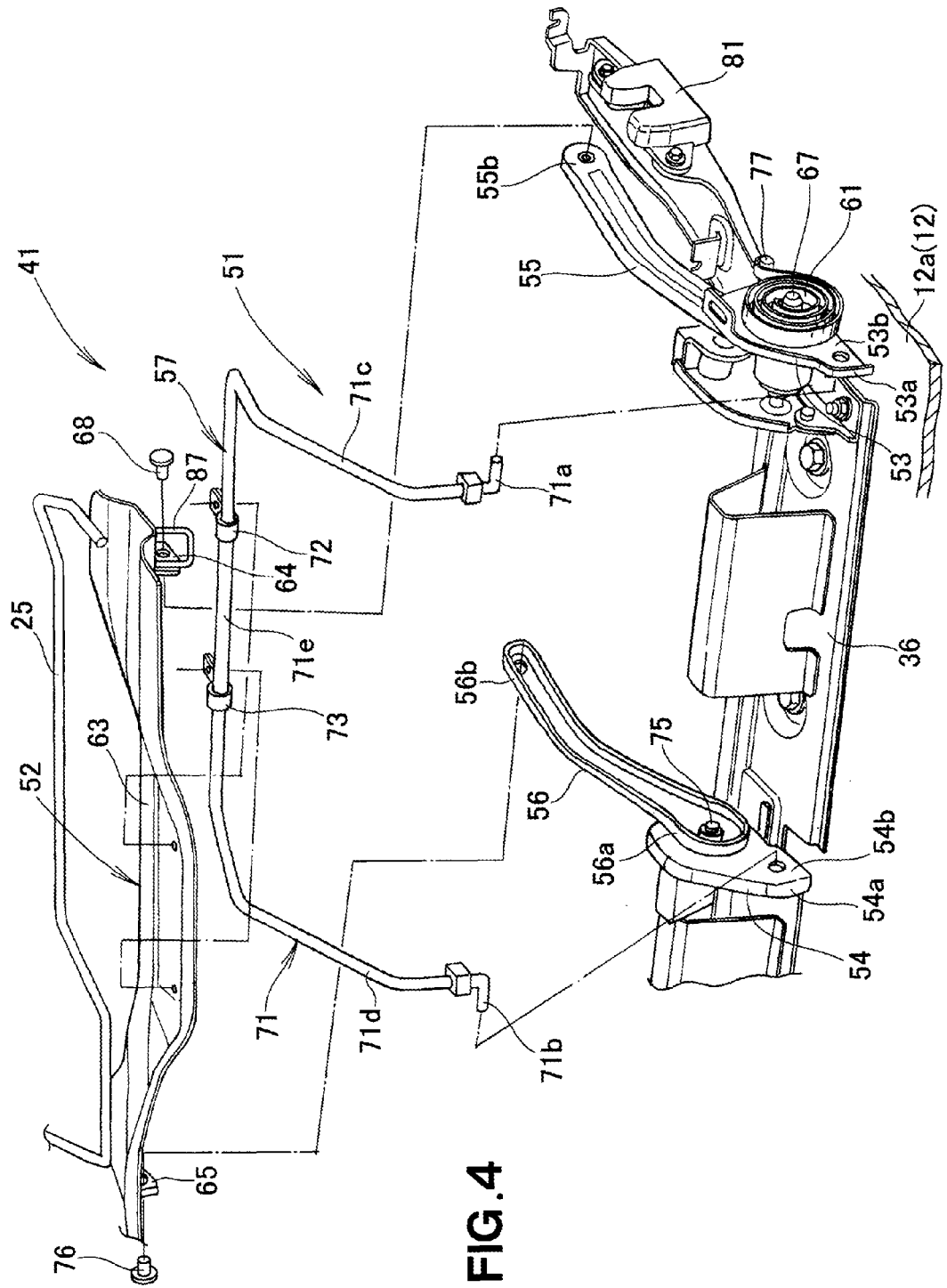
FIG. 4 is an exploded perspective view of a movement mechanism of FIG. 3.

The seat cushion 24 is supported by a seat cushion base 36 via a link mechanism 51 (FIG. 4). Since the seat cushion base 36 is disposed on a left half of the rear part 12a of the vehicle body floor 12, the seat cushion 24 is connected to the left half of the rear part 12a of the vehicle body floor 12 via the seat cushion base 36 and the link mechanism 51.

The seat cushion 24 includes a seat cushion frame 25 disposed in substantially parallel to the left half of the vehicle body floor 12 (the rear part 12a), and a cushion portion 26 supported by the seat cushion frame 25.

The seatback 27 includes a seatback frame 28 pivotably connected to the vehicle body floor 12, and a cushion portion 29 supported by the seatback frame 28. A headrest 31 includes a headrest frame 32 disposed on a top portion 28a of the seatback frame 28, and a cushion portion 33 supported by the headrest frame 32.

The structure 40 includes a movement mechanism 41 for turning the seat cushion 24 upwardly, a seat cushion locking mechanism 42 for retaining the seat cushion 24, and operation means 43 operable to unlock the seat cushion locking mechanism 42.

The structure 40 further includes a forward folding mechanism 44 for folding the seatback 27 forwardly, a seatback locking mechanism (locking mechanism) 45 for retaining the seatback 27, a headrest forward folding/locking mechanism 46 for folding the headrest 31, and a linkage 47 for unlocking the seatback locking mechanism 45 upon the upward turning of the seat cushion 24.

Figure 3:
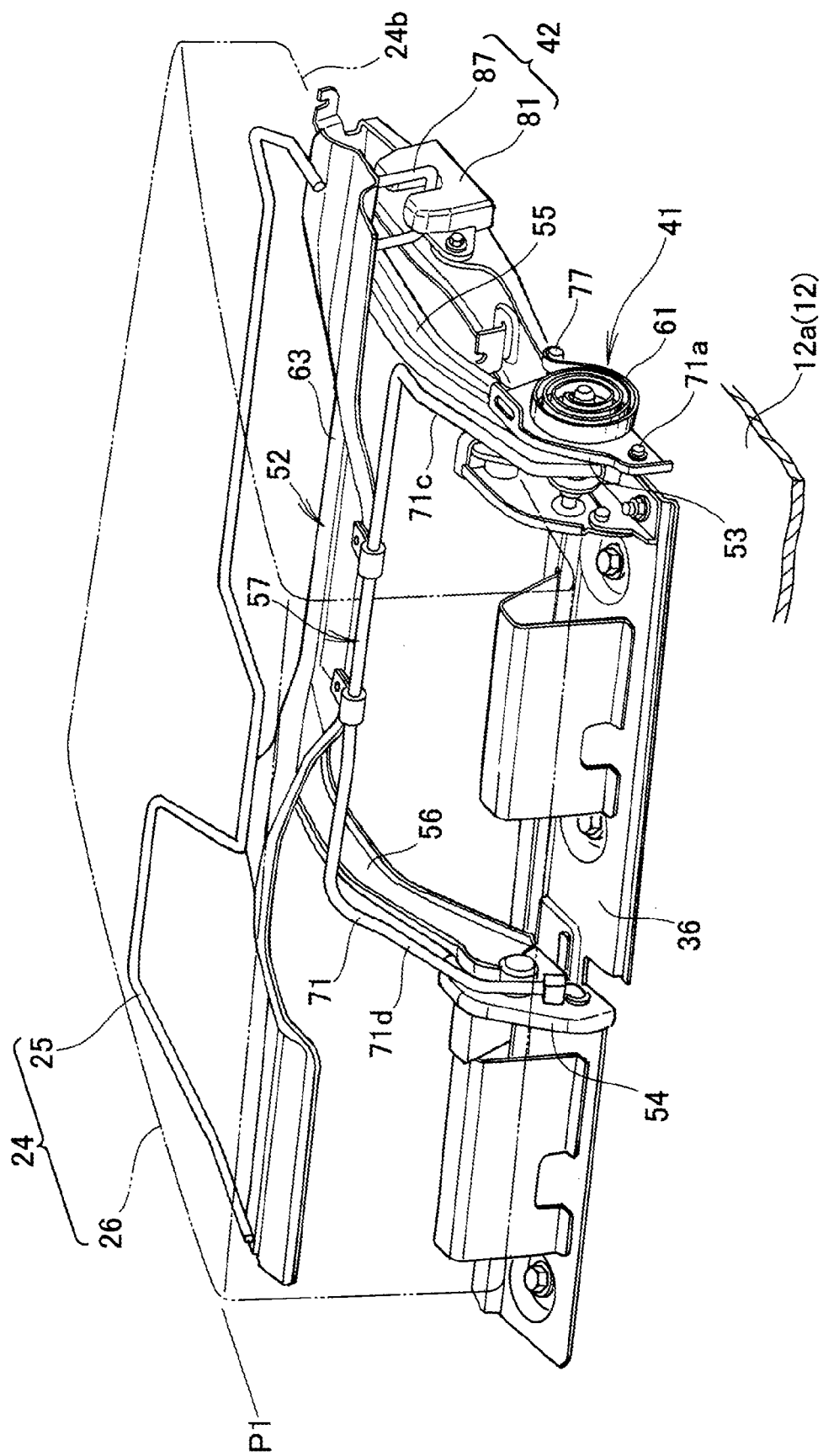
FIG. 3 is an enlarged view of a region 3 of FIG. 2.
Figure 28:
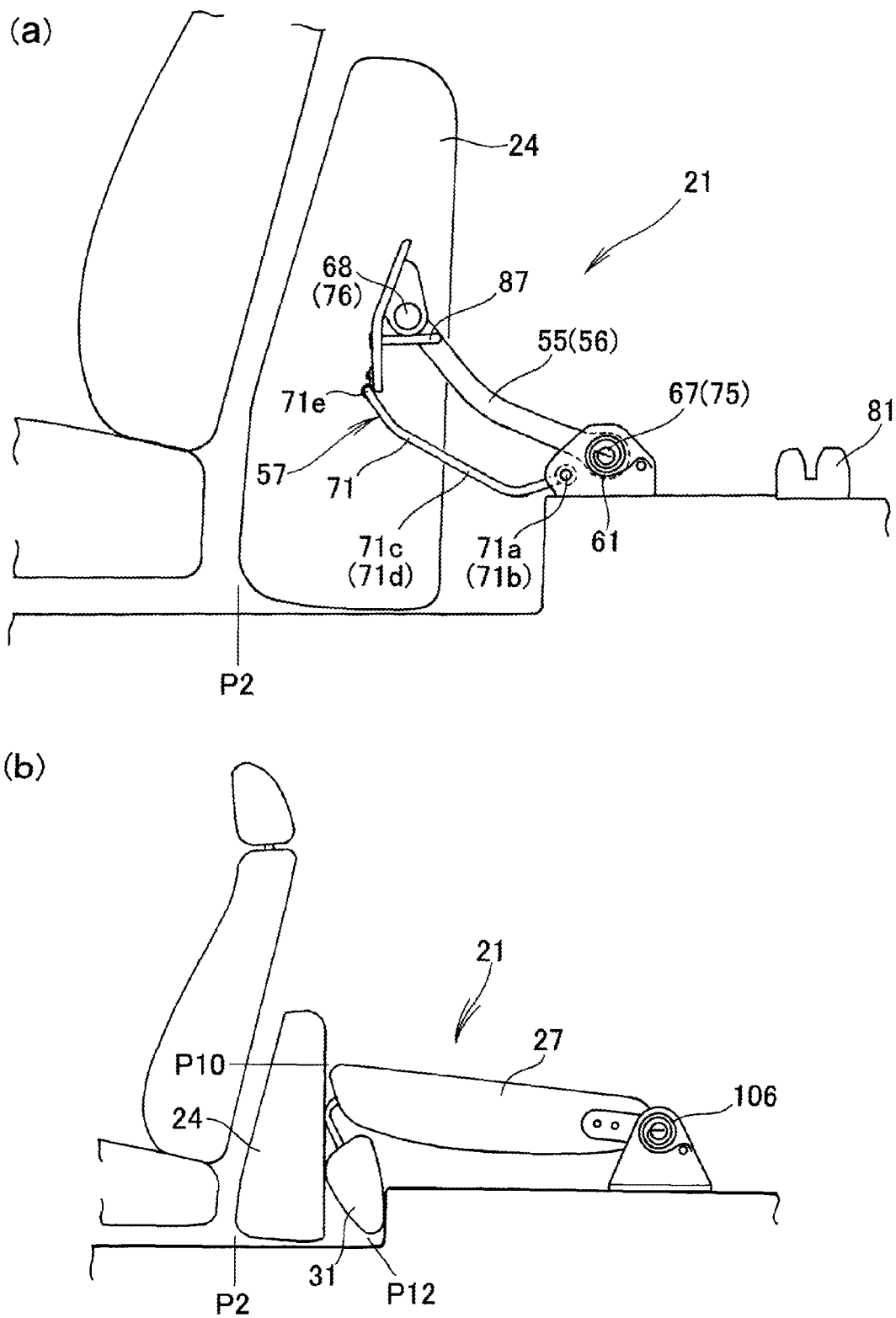
FIGS. 28(a) and 28(b) are views showing a left rear seat folded.

As shown in FIG. 3 and FIG. 4, the movement mechanism 41 is a mechanism for moving the seat cushion 24 between a seating position P1 and a stowed position P2 (FIG. 28(a)) located forwardly of the seating position P1. The movement mechanism 41 includes the link mechanism 51 for supporting the seat cushion 24 in such a manner as to allow the seat cushion 24 to turn upwardly, and a spring member (first urging member) 61 for urging the link mechanism 51 forwardly of the vehicle body.

The link mechanism 51 includes a cross member 52 disposed on the seat cushion frame 25 (a bottom portion 24b (FIG. 5) of the seat cushion 24), and left and right front support brackets (support brackets) 53, 54 disposed on the vehicle body floor 12 and located forwardly of the cross member 52.

The link mechanism 51 further includes a left side link 55 interconnecting the left front support bracket 53 and the cross member 52, a right side link 56 interconnecting the right front support bracket 54 and the cross member 52, and a guide link 57 disposed adjacent the left and right side links 55, 56.

Figure 5:
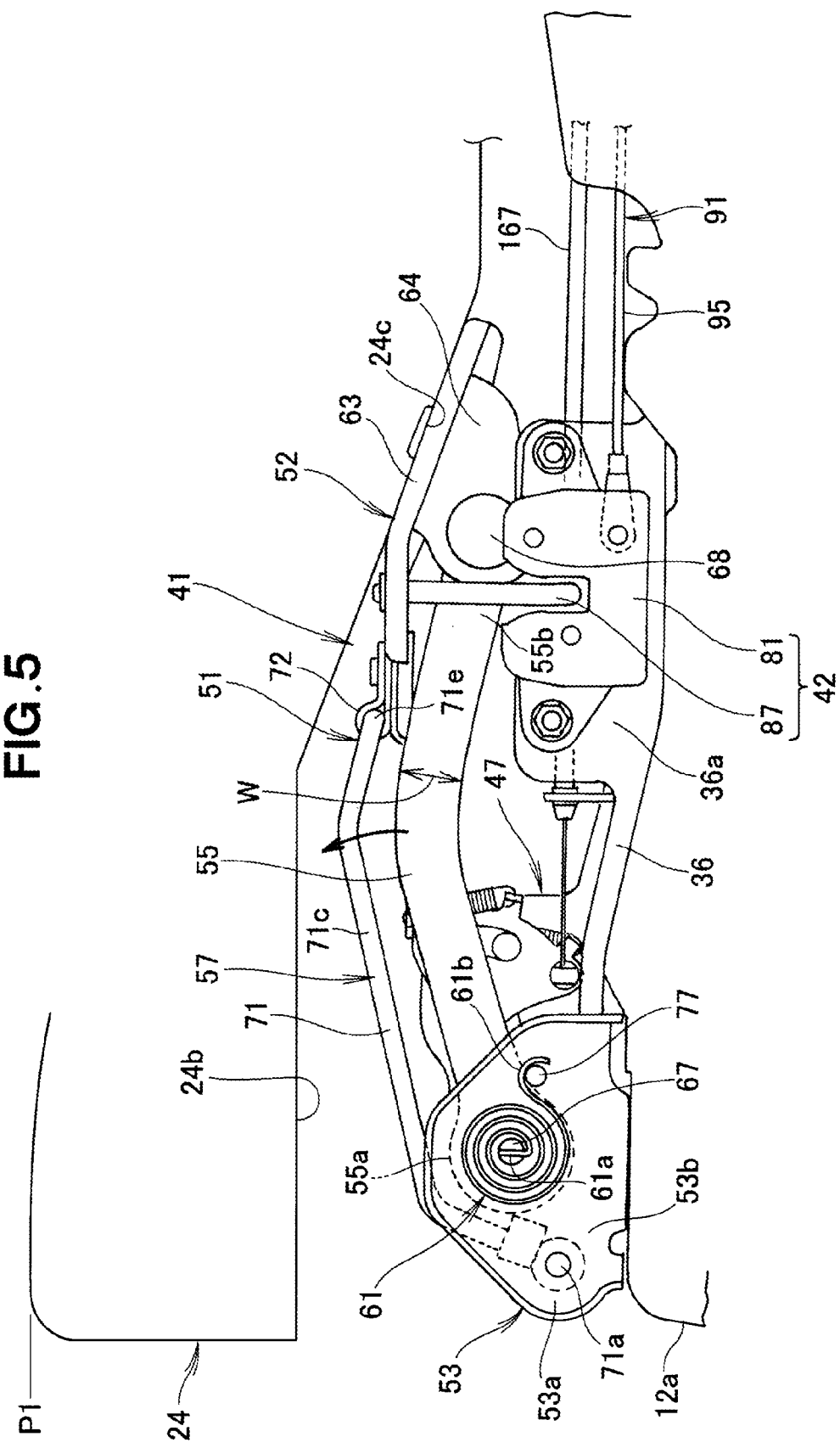
FIG. 5 is a side elevation view of the movement mechanism of FIG. 3.

As shown in FIG. 4 and FIG. 5, the cross member 52 includes a strip or flat plate member 63 disposed on the bottom portion 24b of the seat cushion 24, and left and right connection brackets 64, 65 protruding downwardly from the flat plate member 63. The flat plate member 63 extends laterally of the vehicle body (laterally of the seat 20) and is disposed on a center 24c of the bottom portion 24b, which center 24c extends transversely to a longitudinal direction of the vehicle body.

The left side link 55 has its upper end portion (an opposite end portion) 55b rotatably connected to the left connection bracket 64 via a left, second rotation support shaft 68. The right connection bracket 65 has the same function as that of the left connection bracket 64, and its detailed description of the right connection bracket 65 will be omitted.

The left front support bracket 53 is located forwardly of the cross member 52. The left front support bracket 53 includes an attachment base portion disposed on the left side of the vehicle body floor 12 (the rear part 12a), and a support portion 53a rising from the attachment base portion. A first, rotation support shaft 67 is rotatably supported by a substantially center of the support portion 53a. A left, first guide support shaft 71a is rotatably disposed at a front location 53b of the support portion 53a, which location 53b is located forwardly of the left, first rotation support shaft 67.

The right front support bracket 54 has the same function as that of the left front support bracket 53, and its detailed description of the right front support bracket 54 will be omitted.

The left side link 55 is a strip member having a width W and is generally dogleg-shaped as viewed in side elevation. The left side link 55 has a lower end portion (one end portion) 55a secured to the left, first rotation support shaft 67. The left, first rotation support shaft 67 is rotatably supported by the substantially center of the support portion 53a. This means that the left side link 55 has the lower end portion 55a rotatably connected to the substantially center of the support portion 53a via the left, first rotation support shaft 67. Further, the left side link 55 has the upper end portion 55b rotatably connected to the left connection bracket 64 of the cross member 52 via the left, second rotation support shaft 68.

The guide link 57 has a guide member 71 connected to the left and right front support brackets 53, 54, and left and right support pieces 72, 73 interconnecting the guide member 71 and the cross member 52.

The guide member 71 includes a left side rod 71c disposed adjacent the left side link 55, a right side rod 71d disposed adjacent the right side link 56, the left, first guide support shaft 71a protruding outwardly from a lower end portion of the left side rod 71c, a right, first guide support shaft (first guide support shaft) 71b protruding outwardly from a lower end portion of the right side rod 71d, and a second guide support shaft 71e interconnecting upper end portions of the left and right side rods 71c, 71d.

The left side rod 71c and the right side rod 71d are spaced at a predetermined interval from each other in substantially parallel. The left and right side rods 71c, 71d and the second guide support shaft 71e define a generally U-shape of the guide member 71 opened forwardly of the vehicle body.

The left, first guide support shaft 71a is rotatably disposed on the front location 53b of the support portion 53a of the left front support bracket 53, which location 53b is located forwardly of the left, first rotation support shaft 67. The right, first guide support shaft 71b is rotatably disposed on a front location 54b of a support portion 54a of the right front support bracket 54, which location 54b is located forwardly of the right, first rotation support shaft 75.

The second guide support shaft 71e is rotatably disposed on the left and right support pieces 72, 73, and the left and right support pieces 72, 73 are bolted to the cross member 52. That is, the second guide support shaft 71e is rotatably connected to the cross member 52 via the left and right support pieces 72, 73. The second guide support shaft 71e is located rearwardly of the left and right, first guide support shafts 71a, 71b and forwardly of the cross member 52.

Figure 6:
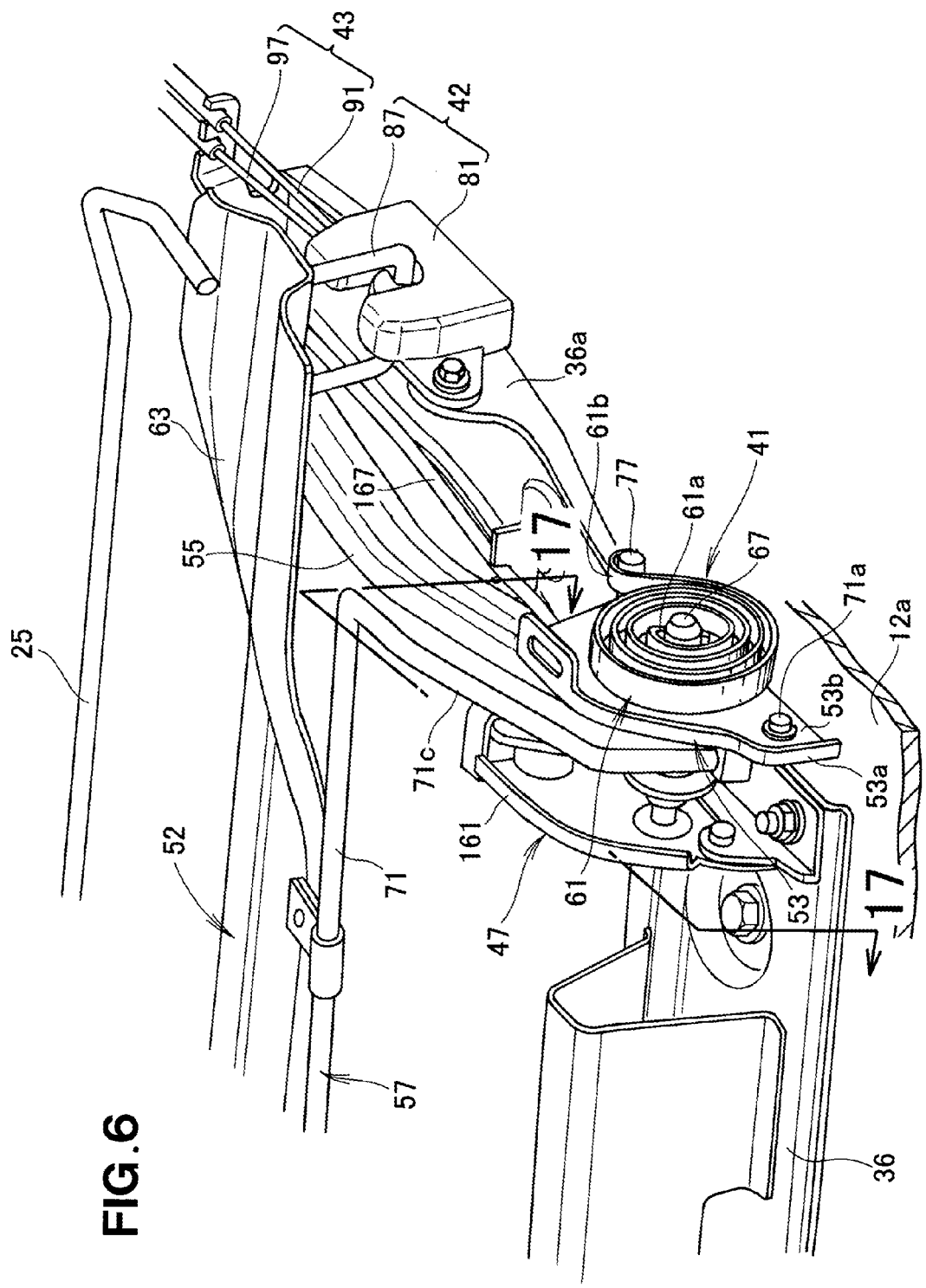
FIG. 6 is a perspective view of the movement mechanism of FIG. 4.

As shown in FIG. 5 and FIG. 6, the spring member 61 is a spirally wound coil having an inner end portion 61a locked by the left, first rotation support shaft 67, and an outer end portion 61b locked by a locking pin 77. The locking pin 77 protrudes outwardly from the left front support bracket 53 (the support portion 53a). The left side link 55 (i.e., the link mechanism 51) is urged by the spring member 61 in a direction of an arrow, such that the left and right side links 55, 56 (FIG. 4) rotate (pivot) on the left and right, first rotation support shafts 67, 75 in the direction of the arrow so as to turn the seat cushion 24 upwardly from the seating portion P1 to the stowed position P2 (FIG. 28(a)).

With the seat cushion 24 shown in FIG. 3 being disposed in the stowed position P2 (FIG. 28(a)), the left side link 55 and the left side rod 71c overlap vertically. Similarly, with the seat cushion 24 being disposed in the stowed position P2 (FIG. 28(a)), the right side link 56 and the right side rod 71d overlap vertically.

As shown in FIG. 4 and FIG. 5, the lower end portion 55a of the left side link 55 is rotatably connected to the left front support bracket 53 via the left, first rotation support shaft 67. Similarly, the right side link 56 has a lower end portion 56a rotatably connected to the right front support bracket 54 via the right, first rotation support shaft 75. The upper end portion 55b of the left side link 55 is rotatably connected to the left connection bracket 64 via the left, second rotation support shaft 68. Similarly, the right side link 56 has an upper end portion 56b rotatably connected to the right connection bracket 65 of the cross member 52 via a right, second rotation support shaft 76. Thus, upon turning upwardly, the seat cushion 24 can be supported by the left and right side links 55, 56.

The left, first guide support shaft 71a of the guide link 57 is rotatably provided forwardly of the left, first rotation support shaft 67. Similarly, the right, first guide support shaft 71b of the guide link 57 is rotatably provided forwardly of the right, first rotation support shaft 75. The second guide support shaft 71e of the guide link 57 is rotatably provided forwardly of the cross member 52. Thus, when the seat cushion 24 is turned upwardly, the guide link 57 can hold the upwardly turned posture of the seat cushion 24 in a preferred manner.

As discussed above, the left and right side links 55, 56 and the guide link 57, that is, the two types of links are provided in such a manner that the left and right side links 55, 56 support the seat cushion 24 and the guide link 57 holds the seat cushion in the upwardly turned posture. In other words, the left and right side links 55, 56 need not serve to hold the seat cushion 24 in the upwardly turned posture. As a result, it becomes possible to restrain rigidity of the left and right side links 55, 56, and thereby downsize the left and right side links 55, 56.

The left and right, first guide support shafts 71a, 71b of the guide link 57 are rotatably provided forwardly of the left and right, first rotation support shafts 67, 75. The second guide support shaft 71e of the guide link 57 is rotatably provided forwardly of the cross member 52. When the seat cushion 24 is turned upwardly, therefore, the guide link 57 maintains a forwardly offset or spaced relationship to the left and right side links 55, 56, thereby increasing rigidity of the movement mechanism 41. As a result, it becomes possible to keep rigidity of the guide link 57 low, and thereby downsize the movement mechanism 41.

Additionally, since the guide link 57 is forwardly spaced from the left and right side links 55, 56 to increase the rigidity of the movement mechanism 41, the seat cushion 24 can move along a path which is kept stable by the movement mechanism 41.

With the seat cushion 24 being disposed in the stowed position P2 (FIG. 28(a)), the left and right side links 55, 56 and the guide link 57 overlap vertically. Since the left and right side links 55, 56 and the guide link 57 overlap, the movement mechanism 41 is difficult to view when the seat cushion 24 is in the stowed position shown in FIG. 28(a), whereby the left rear seat 21 can be look better.

As shown in FIG. 5 and FIG. 6, the seat cushion locking mechanism 42 includes a locking portion 81 disposed on a sidewall 36a of the seat cushion base 36, and a seat cushion striker 87 engageable with the locking portion 81.

The seat cushion striker 87 is disposed on a left end portion of the cross member 52 (the flat plate member 63) and is generally U-shaped. The flat plate member 63 of the cross member 52 is disposed on the bottom portion 24b of the seat cushion 24. That is, the seat cushion striker 87 is connected to the seat cushion frame 25 (the bottom portion 24b of the seat cushion 24) via the flat plate member 63 of the cross member 52.

Figure 7:
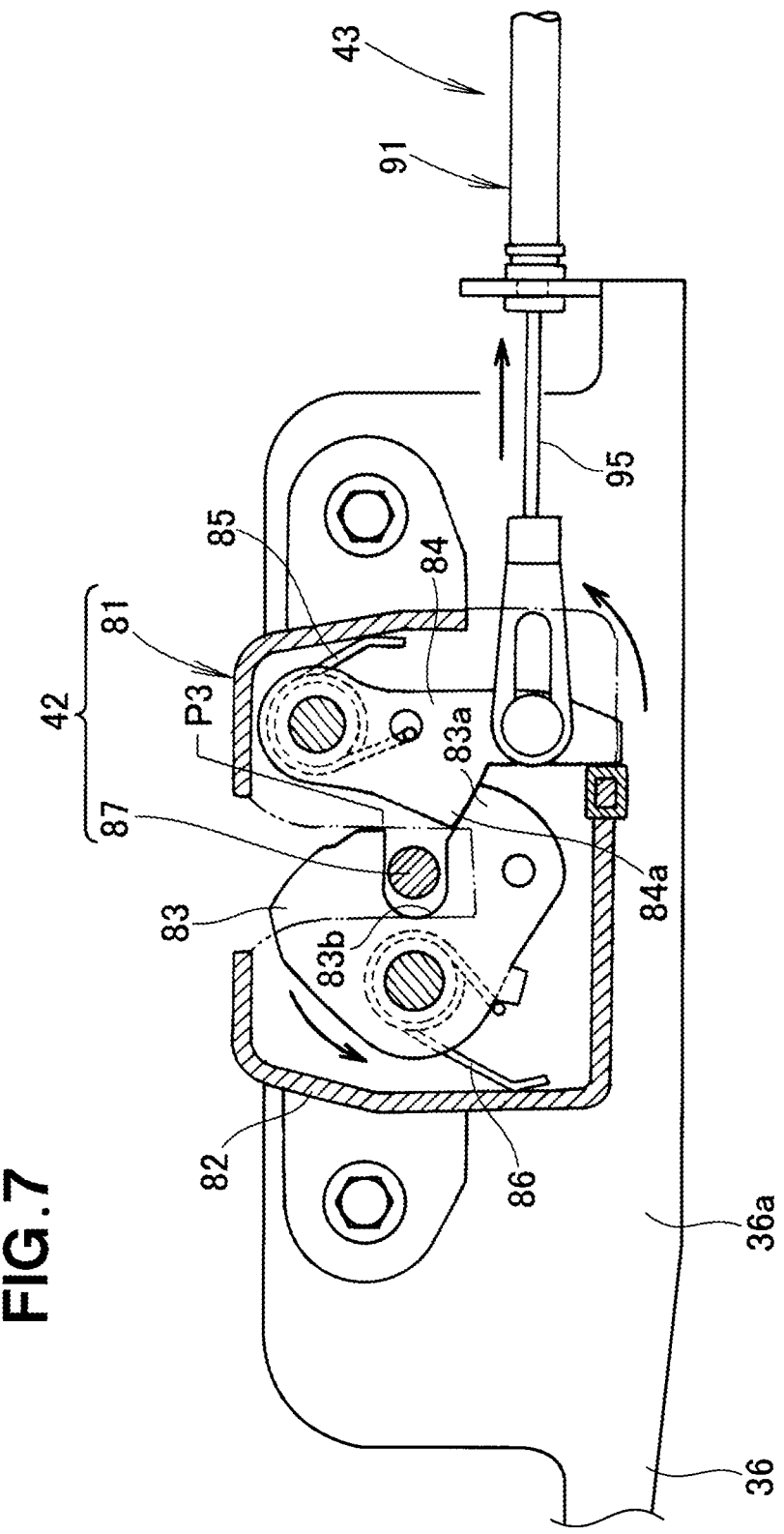
FIG. 7 is a cross-sectional view of a seat cushion locking mechanism shown in FIG. 6.

As shown in FIG. 7, the locking portion 81 includes a case 82 disposed on the sidewall 36a of the seat cushion base 36, a latch 83 rotatably disposed in the case 82, and a ratchet 84 operable to hold the latch 83 in an engaged position P3.

The seat cushion striker 87 can be locked in a locking groove 83b of the latch 83 by engagement of a locking tooth 84a of the ratchet 84 with a locking portion 83a of the latch 83, such that the seat cushion 24 is held in the seating position P1 (FIG. 5).

Then, the ratchet 84 is pulled by the operation means 43 (a first operation portion 91) in a direction of an arrow to thereby move in a direction of an arrow against an urging force of a ratchet spring member 85. The movement of the ratchet 84 releases the locking tooth 84a of the ratchet 84 from the locking portion 83a of the latch 83, thereby allowing the latch 83 to rotate counterclockwise under an urging force of a latch spring 86, as indicated by an arrow. The rotational movement of the latch 83 in a direction of the arrow allows the seat cushion striker 87 to come out of the locking groove 83b of the latch 83.

Figure 8:
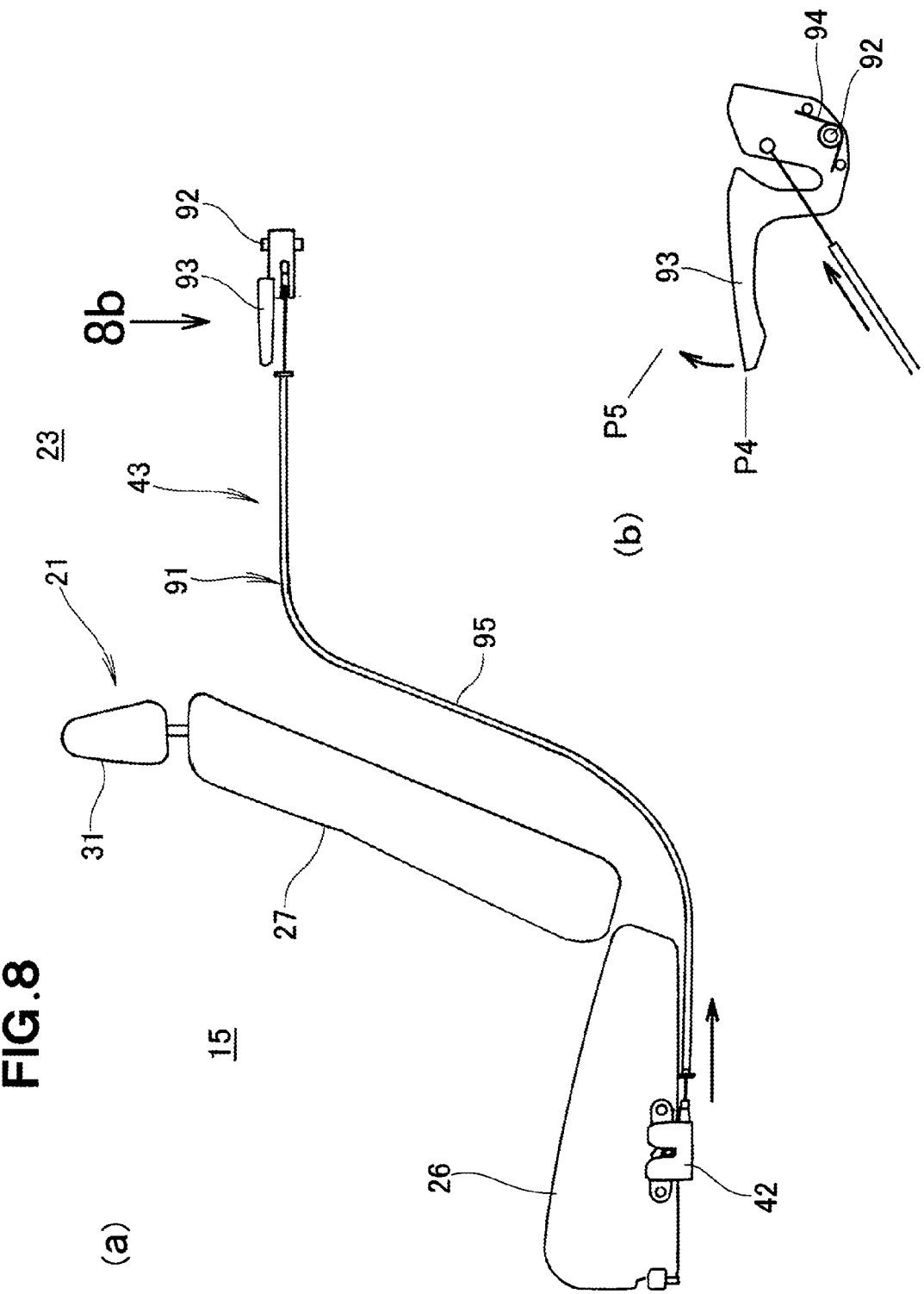
FIGS. 8(a) and 8(b) are side elevation views of operation means shown in FIG. 2.

As shown in FIG. 8 and FIG. 9, the operation means 43 includes the first operation portion 91 operable from a side of a rear opening 17 with a tail gate 16 being opened, and a second operation portion 97 operable from a side of a left side opening 19 with a left rear side door 18 being opened.

The first operation portion 91 includes an operational lever 93 attached to the left side lining 13 (FIG. 1) in such a manner as to pivot on an operational pivot 92, an operational spring member 94 for holding the operational lever 93 in a ready position P4, and a first operational cable 95 interconnecting the operational lever 93 and the ratchet 84 (FIG. 7).

With the tail gate 16 at a rear part of the vehicle 10 being in an open position to open the rear opening 17, the operational lever 93 is manipulated from a side of a luggage compartment 23. More specifically, the operational lever 93 is manipulated to pivot in a direction of an arrow toward an operating position P5 against the urging forces of the operational spring member 94 and the ratchet spring member (FIG. 7).

The manipulation of the operational lever 93 to pivot toward the operating position P5 pulls the first operational cable 95 in a direction of an arrow. The pull on the operational spring member 94 rotates the ratchet 84 shown in FIG. 7 in the direction of the arrow against the urging force of the ratchet spring member 85. The manipulation of the operational lever 93 in the above manner unlocks the seat cushion locking mechanism 42.

As shown in FIG. 9(b) and FIG. 10, the second operation portion 97 includes an operational strap 98 having its distal end portion 98a disposed below the seat cushion 24 in opposed relationship to the left side opening 19, and a second operational cable 99 interconnecting a proximal end portion 98b of the operational strap 98 and the ratchet 84.

With the left rear side door 18 at a lateral side of the vehicle 10 being in an opened position to open the left side opening 19, the operational strap 98 is manipulated from a side of the passenger compartment 15. More specifically, the operational strap 98 is manipulated to move in a direction of an arrow from a ready position P6 to an operating position P7 against the urging force of the ratchet spring member 85 (FIG. 7).

The manipulation of the operational strap 98 in the above manner pulls the second operation cable 99 in a direction of an arrow. The pull on the second operation cable 99 moves the ratchet 84 shown in FIG. 7 in the direction of the arrow against the urging force of the ratchet spring member 85. The manipulation of the operational strap 98 in this manner unlocks the seat cushion locking mechanism 42.

Figure 11:
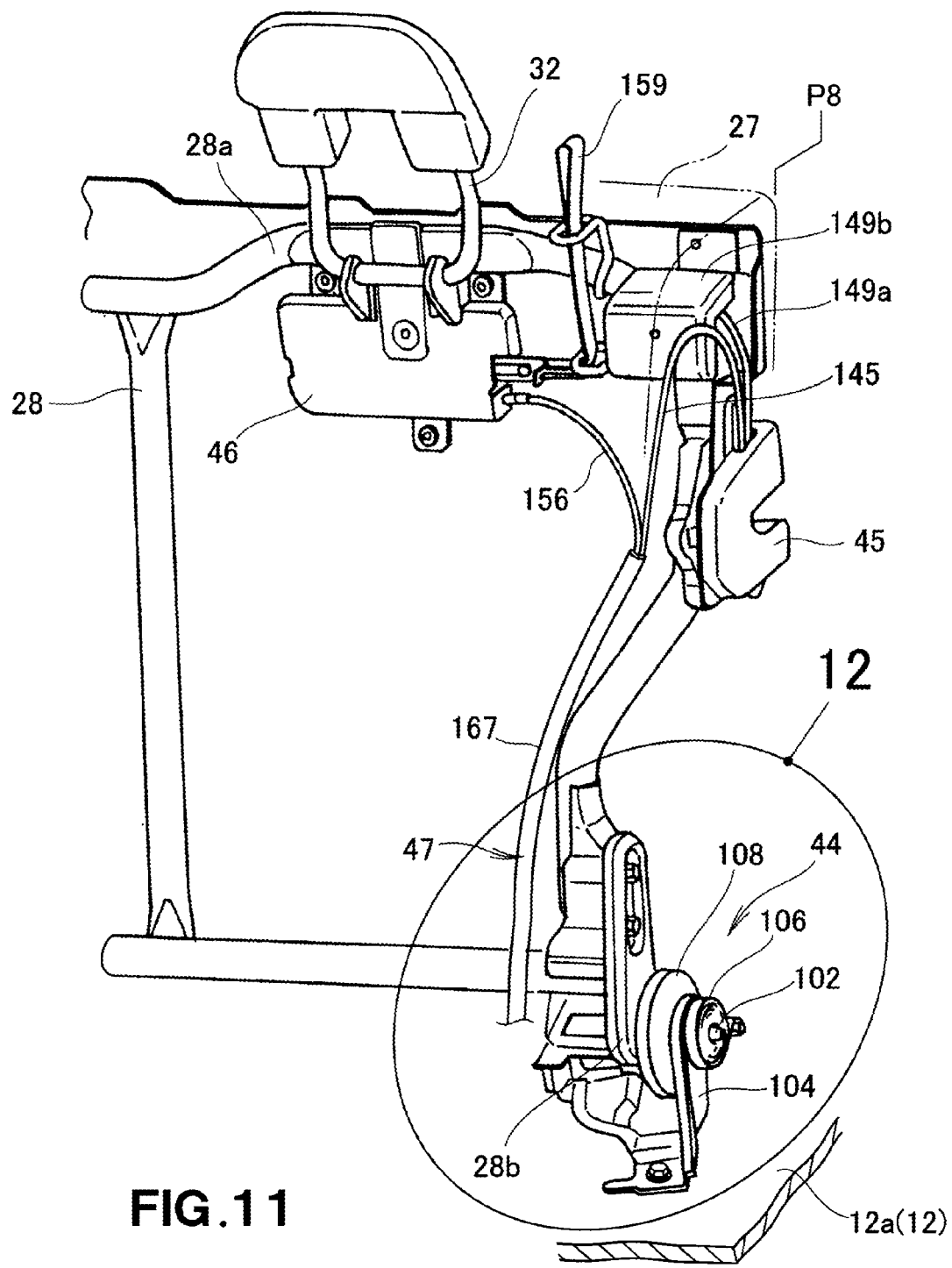
FIG. 11 is an enlarged view of a region 11 of FIG. 2.

As shown in FIG. 11, the seatback 27 is supported by the vehicle body floor 12 (the rear part 12a) in such a manner as to pivot back and forth on left and right, support shafts 102 (a right one of which is not shown). The seatback 27 carries the forward folding mechanism 44. The forward folding mechanism 44 allows the seatback 27 to move between a first riding position (rising position) P8 and a forward folded position P10 (FIG. 28(b)).

The forward folding mechanism 44 includes the left support shaft (support shaft) 102 and the right support shaft disposed at a lower end portion of the seatback 27, a left rear support bracket 104 rotatably supporting the left support shaft 102, a right rear support bracket 105 (FIG. 2) rotatably supporting the right support shaft, a spring member (second urging member) 106 for urging the seatback 27 forwardly of the vehicle body, and a damper member 108 for restraining a speed at which the seatback 27 is folded forwardly.

The right support shaft and the right rear support bracket 105 have the same functions as those of the left support shaft 102 and the left rear support bracket 104, and their detailed descriptions of the right support shaft and the right rear support bracket 105 will be omitted.

As shown in FIG. 12, the left support shaft 102 protrudes outwardly from a left lower end portion 28b of (the seatback frame 28) of the seatback 27 and is rotatably supported by a support portion 104b of the left rear support bracket 104.

The left rear support bracket 104 includes an attachment base portion 104a disposed on the left side of the vehicle body floor 12 (the rear part 12a), and the support portion 104b rising from the attachment base portion 104a. The left support shaft 102 is rotatably supported by the support portion 104 via a bush. That is, the seatback 27 is rotatably supported by the left side of the vehicle body floor 12 (the rear part 12a) via the left support shaft 102 and the left rear support bracket 104.

The spring member 106 is a spirally wound coil spring having an inner end portion 106a locked in a locking hole 102a of the left support shaft 102, and an outer end portion 106b locked by a locking pin 112. The locking pin 112 protrudes outwardly from the support portion 104b of the left rear support bracket 104.

The left support shaft 102 (i.e., the seatback 27) is urged by the spring member 106 in a direction of an arrow. That is, the seatback 27 is urged by the spring member 106 toward the forward folded position P10 (FIG. 28(b)), such that the seatback 27 is forced by the spring member 106 to forwardly fold by pivoting on the left support shaft 102 and the right support shaft from the first rising position P8 to the forward folded position P10.

Figure 13:
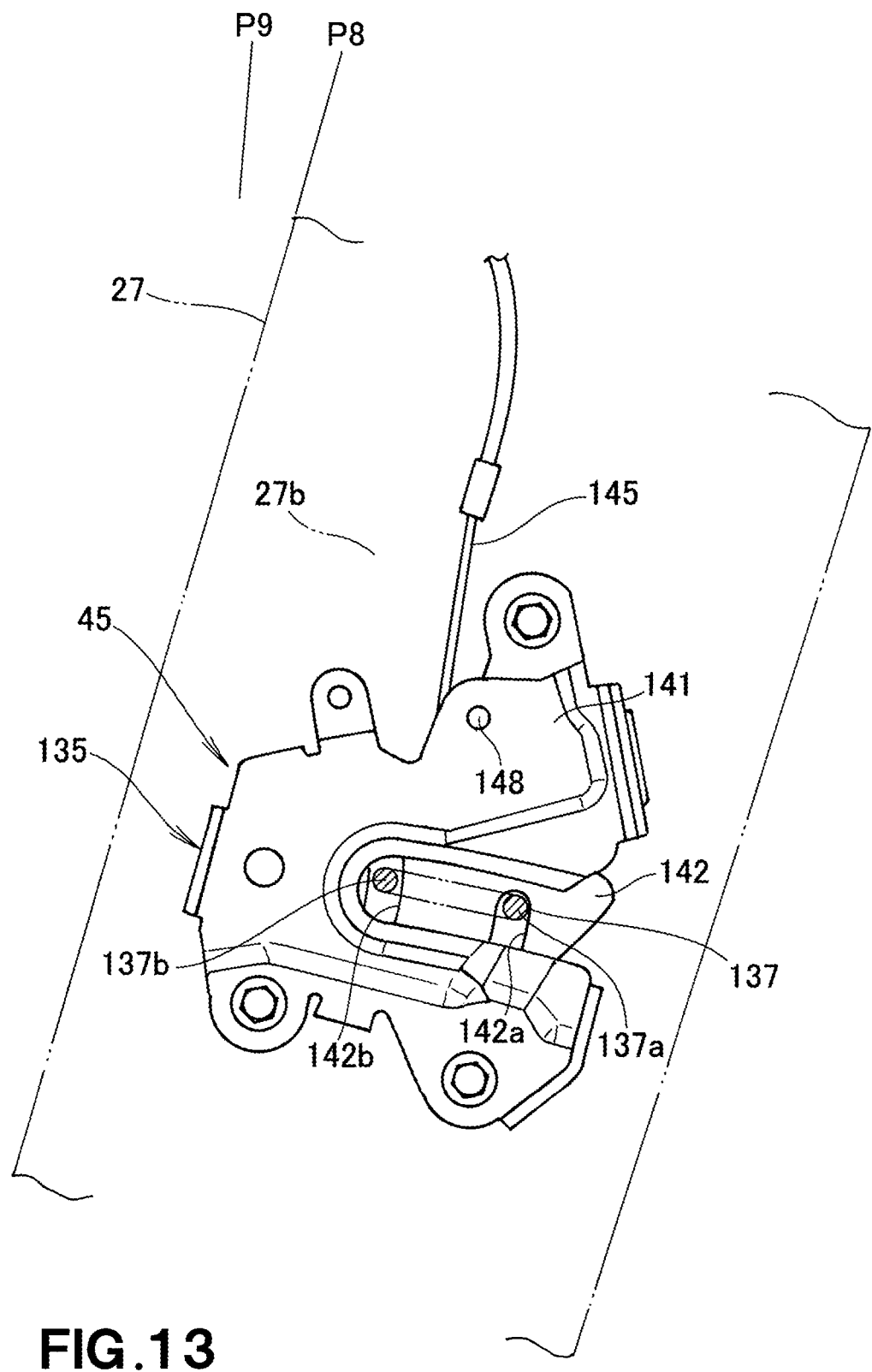
FIG. 13 is a side elevation view of a seatback locking mechanism shown in FIG. 11.
Figure 14:
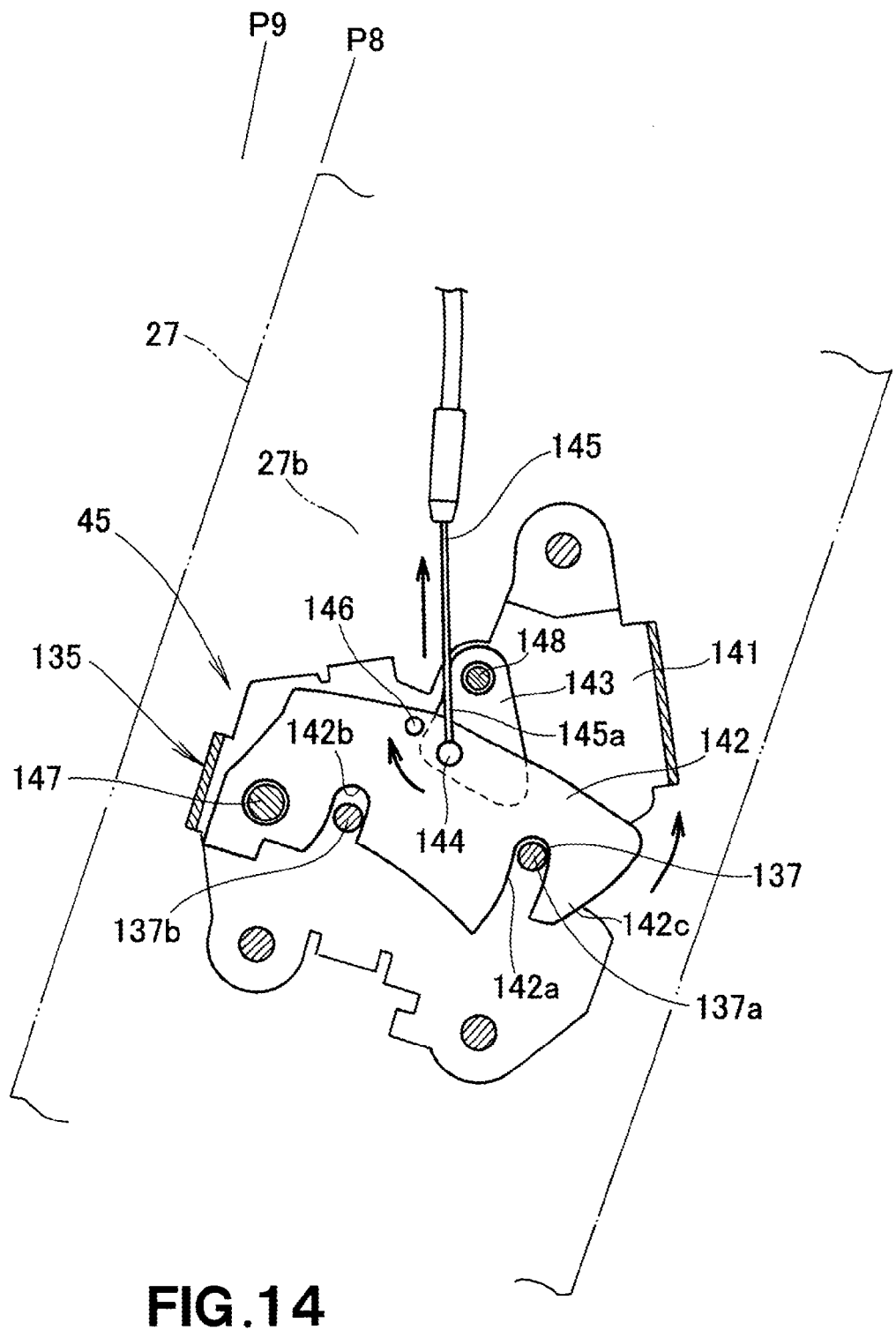
FIG. 14 is a cross-sectional view of the seatback locking mechanism shown in FIG. 13

As shown in FIG. 13 and FIG. 14, the seatback locking mechanism 45 is a double locking mechanism designed to selectively hold the seatback 27 in either the first rising position P8 or a second rising position P9 located forwardly of the first rising position P8.

The second rising position P9 is a position in which the seatback 27 acts as a backrest for a passenger sitting on the left rear seat 21. The first rising position P8 is a reclining position in which the seatback 27 is reclined rearwardly from the second rising position P9.

By reclining the seatback 27 rearwardly from the second rising position P9 to the first rising position P8, a large space for loading luggage etc. onto the left rear seat 21 is available. Use of the seatback locking mechanism 45 acting as the double locking mechanism is convenient because the seatback 27 can be adjusted to a position suitable for an intended purpose.

The seatback locking mechanism 45 includes a double locking portion 135 disposed on a left side portion 27b of the seatback 27, and a generally-U-shaped double striker 137 engageable with the double locking portion 135. The double striker 137 is disposed on a left sidewall of the vehicle body and has a first locking portion 137a and a second locking portion 137b.

The double locking portion 135 includes a case 141 disposed on the left side portion 27b of the seatback 27, a latch 142 and an actuating piece 143 rotatably disposed in the case 141, a connection pin 144 interconnecting the latch 142 and the actuating piece 143, a seatback operating cable 145 having a distal end portion 145a connected to the connection pin 144, and an actuating pin 146 disposed on the latch 142.

The latch 142 includes a first locking groove 142a lockingly engageable with the first locking portion 137a of the double striker 137, and a second locking groove 142b lockingly engageable with the second locking portion 137b of the double striker 137.

The locking engagement of the first locking groove 142a of the latch 142 with the first locking portion 137a and the locking engagement of the second locking groove 142b with the second locking portion 137b hold the seatback 27 in the first rising portion (the reclining position) P8. The locking engagement of the first locking groove 142a of the latch 142 with the second locking portion 137b holds the seatback 27 in the second rising position (acting as the backrest) P9.

The seatback operating cable 145 is pulled in a direction of an arrow with the seatback 27 being held in the first rising position P8. The pull on the seatback operating cable 145 causes the actuating piece 143 to rotate on an actuating piece pin 148 in a direction of an arrow against an urging force of an actuating piece spring (not shown).

The rotation of the actuating piece 143 brings the actuating piece 143 into abutment on the actuating piece pin 146. The actuating piece pin 146 is raised by continuing to pull the seatback operating cable 145 in the direction of the arrow. The raising of the actuating piece pin 146 causes the latch 142 to rotate on a latch pin 147 in a direction of an arrow against an urging force of a latch spring (not shown). The rotation of the latch 142 releases the first locking groove 142a from the first locking portion 137a and releases the second locking groove 142b from the second locking portion 137b. As a result, the seatback 27 is put into a released state in which the seatback 27 is not held in the first rising position P8.

When the seatback operating cable 145 is pulled in the direction of the arrow with the seatback 27 being held in the second rising position P9, on the other hand, the actuating piece 143 rotates the latch 142 in the direction of the arrow. The rotation of the latch 142 in the direction of the arrow releases the first locking groove 142a from the second locking portion 137b. As a result, the seatback 27 is put into a released state in which the seatback 27 is not held in the second rising position P9.

The seatback locking mechanism 45 includes another seatback operating cable 149a (FIG. 11) in addition to the seatback operating cable 145. The seatback operating cable 149a is connected to a reclining operation portion 149b (FIG. 11) on the back side of the seatback 27.

Manually manipulating the reclining operation portion 149b from behind the seatback 27 pulls the seatback operating cable 149a in the same manner as the seatback operating cable 145. As a result, the latch 142 is rotated in the direction of the arrow to hold the seatback 27 in one selected from the first rising position P8 and the second rising position P9.

Figure 15:
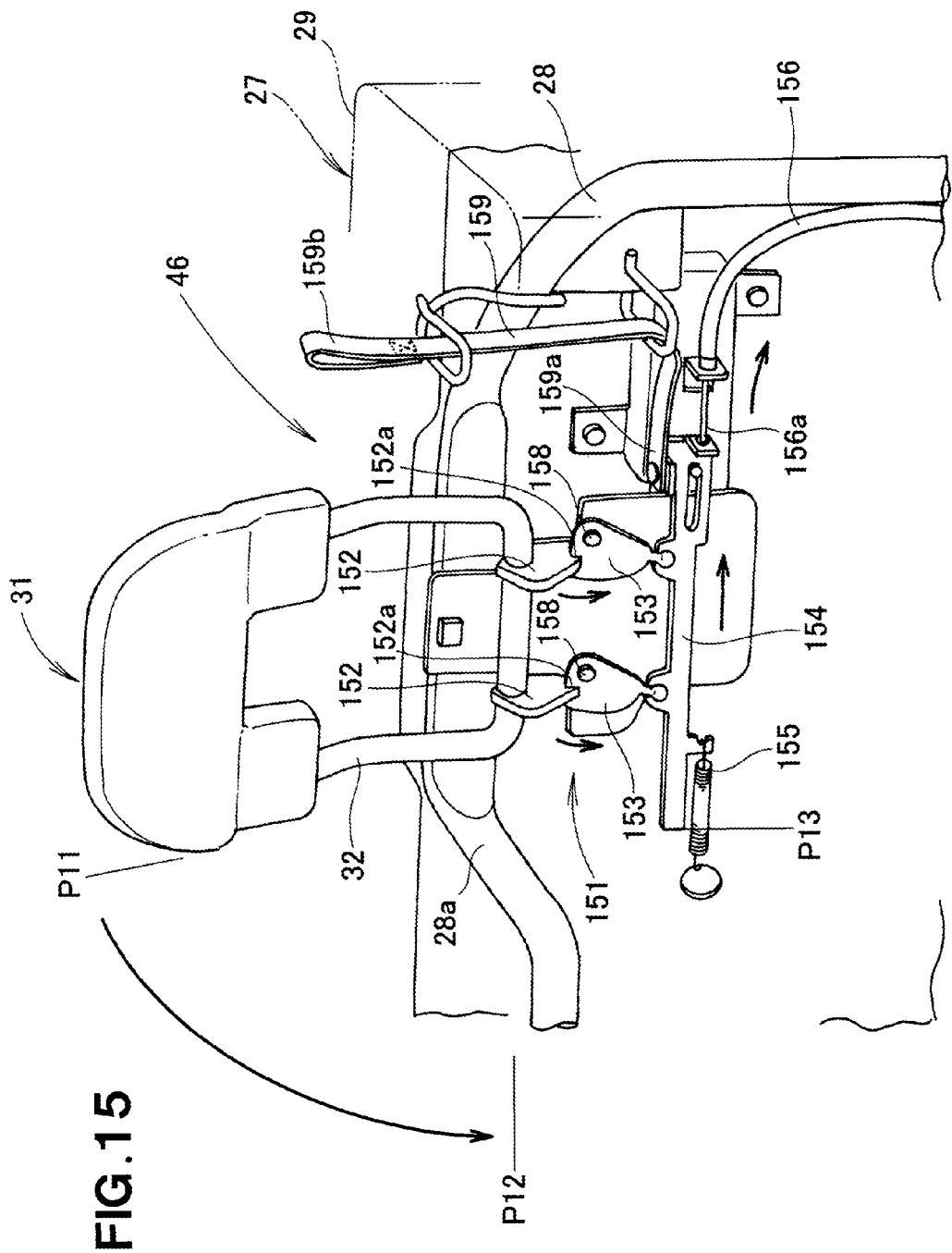
FIG. 15 is a side elevation view of a headrest forward folding/locking mechanism shown in FIG. 11.

As shown in FIG. 15, the headrest forward folding/locking mechanism 46 includes a forward folding spring member (now shown) for forwardly folding the headrest 31, and headrest locking means 151 for holding the headrest 31 in an upright position P11.

The headrest locking means 151 includes a pair of first locking pieces 152 disposed on the headrest frame 32, a pair of second locking pieces 153 lockingly engageable with the pair of first locking pieces 152, an operating bar 154 connected to the pair of second locking pieces 153, a tension spring member 155 for holding the operating bar 154 in a locked position P13, and a headrest operating cable 156 having a distal end portion 156a connected to the operating bar 154.

The pair of second locking pieces 153 is locked in locking grooves 152a of the pair of first locking pieces 152 to thereby hold the headrest 31 in the upright position P11. In this state, the headrest operating cable 156 is pulled in a direction of an arrow to thereby move the operating bar 154 in a direction of an arrow against an urging force of the tension spring member 155.

The movement of the operating bar 154 rotates the pair of second locking pieces 153 in a direction of an arrow by means of a support pin 158. The rotation of the pair of second locking pieces 153 releases the pair of second locking pieces 153 from the locking grooves 152a of the pair of first locking pieces 152. As a result, the headrest 31 is put into a released state in which the headrest 31 is not held in the upright position P11. Under the urging force of the forward folding spring member, the headrest 31 can be folded forwardly from the upright position P11 to a forward folded position P12, as indicated by an arrow.

By turning the headrest 31 from the forward folded position P12 back to the upright position P11 against the urging force of the forward folding spring member, the pair of second locking pieces 153 is locked in the locking grooves 152a of the pair of first locking pieces 152. As a result, the headrest 31 is held in the upright position P1.

The headrest locking means 151 includes an operating strap 159 connected to the operating bar 154. The operating strap 159 has a proximal end portion 159a connected to the operating bar 154, and a distal end portion 159b protruding upwardly from an upper end portion of seatback 27 (the cushion portion 29). By manually pulling up the operating strap 159, the operating bar 154 is moved to release the pair of second locking pieces 153 from the locking grooves 152a of the pair of first locking pieces 152. That is, by manually pulling up the operating strap 159, the headrest 31 can be folded forwardly from the upright position P11 to the forward folded position P12.

Figure 16:
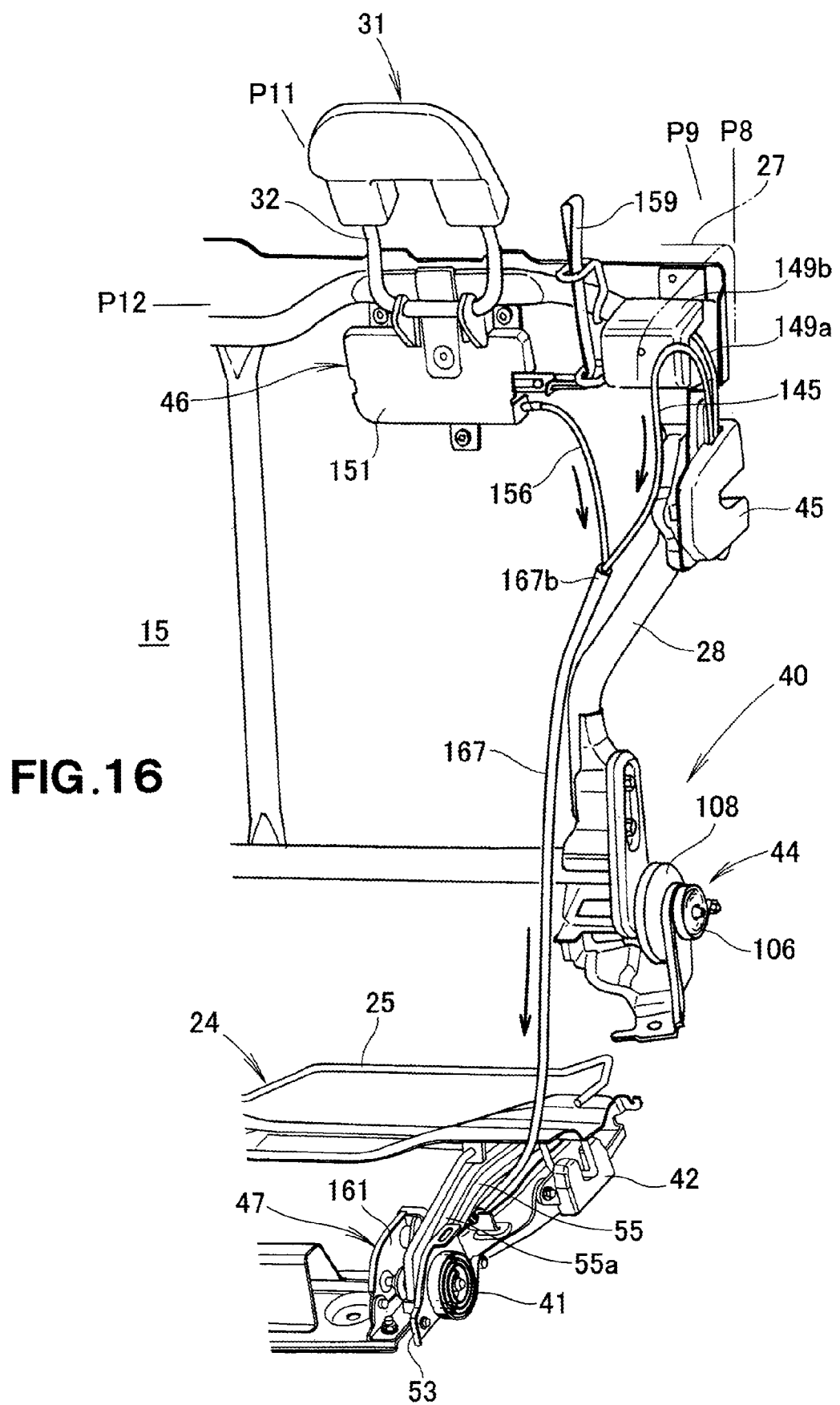
FIG. 16 is a perspective view of a double fall-down mechanism shown in FIG. 2.

As shown in FIG. 16, the linkage 47 is a mechanism capable of unlocking the seatback locking mechanism 45 and the headrest locking means 151 upon upward turning (movement) of the seat cushion 24 from the seating position P1 (FIG. 5) to the stowed position P2 (FIG. 28(a)). By unlocking the seatback locking mechanism 45, the seatback 27 is put into the released state in which the seatback 27 is not held by the seatback locking mechanism 45. By unlocking the headrest locking means 151, the headrest 31 is put into the released state in which the headrest 31 is not held by the headrest locking means 151.

As shown in FIG. 6 and FIG. 16, the linkage 47 is disposed at a front lower portion of the seat cushion 24 (FIG. 1) and is connected to the seatback locking mechanism 45 and the headrest forward folding/locking mechanism 46 through a linkage cable 167. The linkage 47 can unlock the seatback locking mechanism 45 and the headrest locking means 151 upon upward turning of the seat cushion 24.

Figure 17:
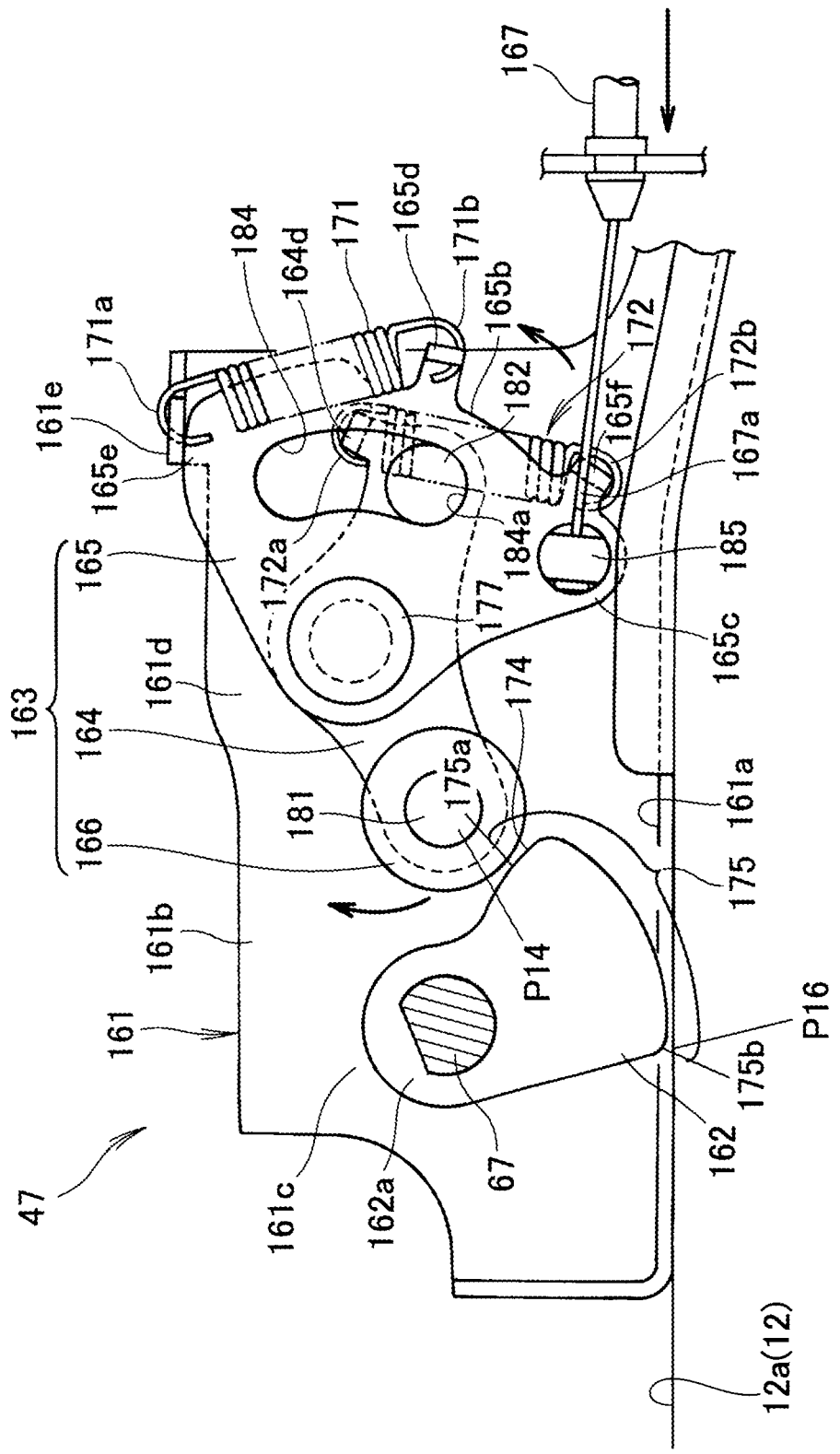
FIG. 17 is a cross-sectional view taken along line 17-17 of FIG. 6.
Figure 18:
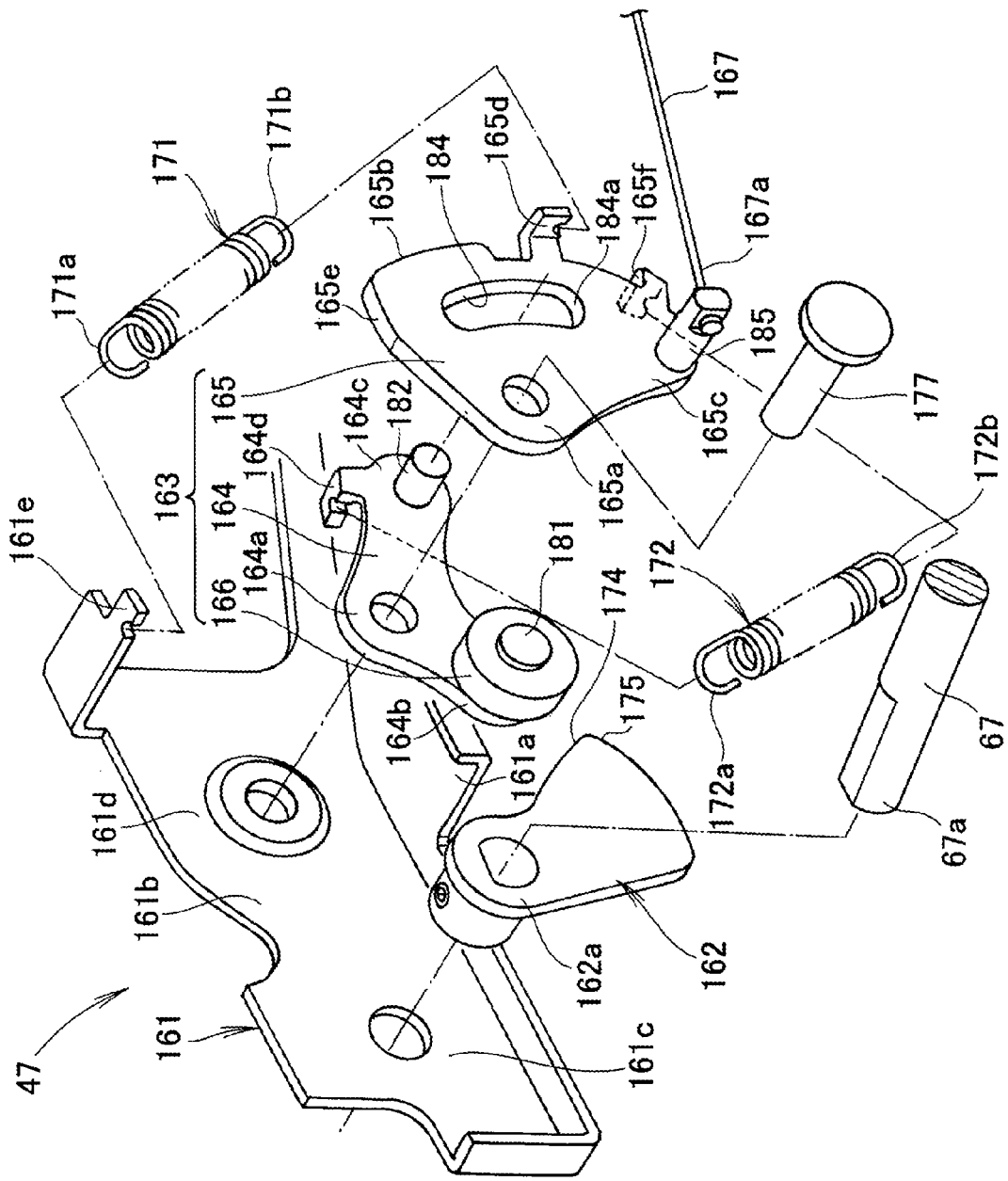
FIG. 18 is an exploded perspective view of a linkage shown in FIG. 17.

As shown in FIG. 17 and FIG. 18, the linkage 47 includes a linkage bracket 161 disposed on the left side of the vehicle body floor 12 (the rear part 12a), a hammer member 162 integral with the left, first rotation support shaft 67 rotatably supported by the linkage bracket 161, a release member 163 adapted to abut on the hammer member 162, and the linkage cable 167 interconnecting the release member 163 and each of the seatback locking mechanism 45 (FIG. 16) and the headrest locking means 151 (FIG. 16). The left, first rotation support shaft 67 is disposed laterally outwardly of the linkage bracket 161 and has an inner end portion 67a rotatably supported by the linkage bracket 161.

Figure 27:
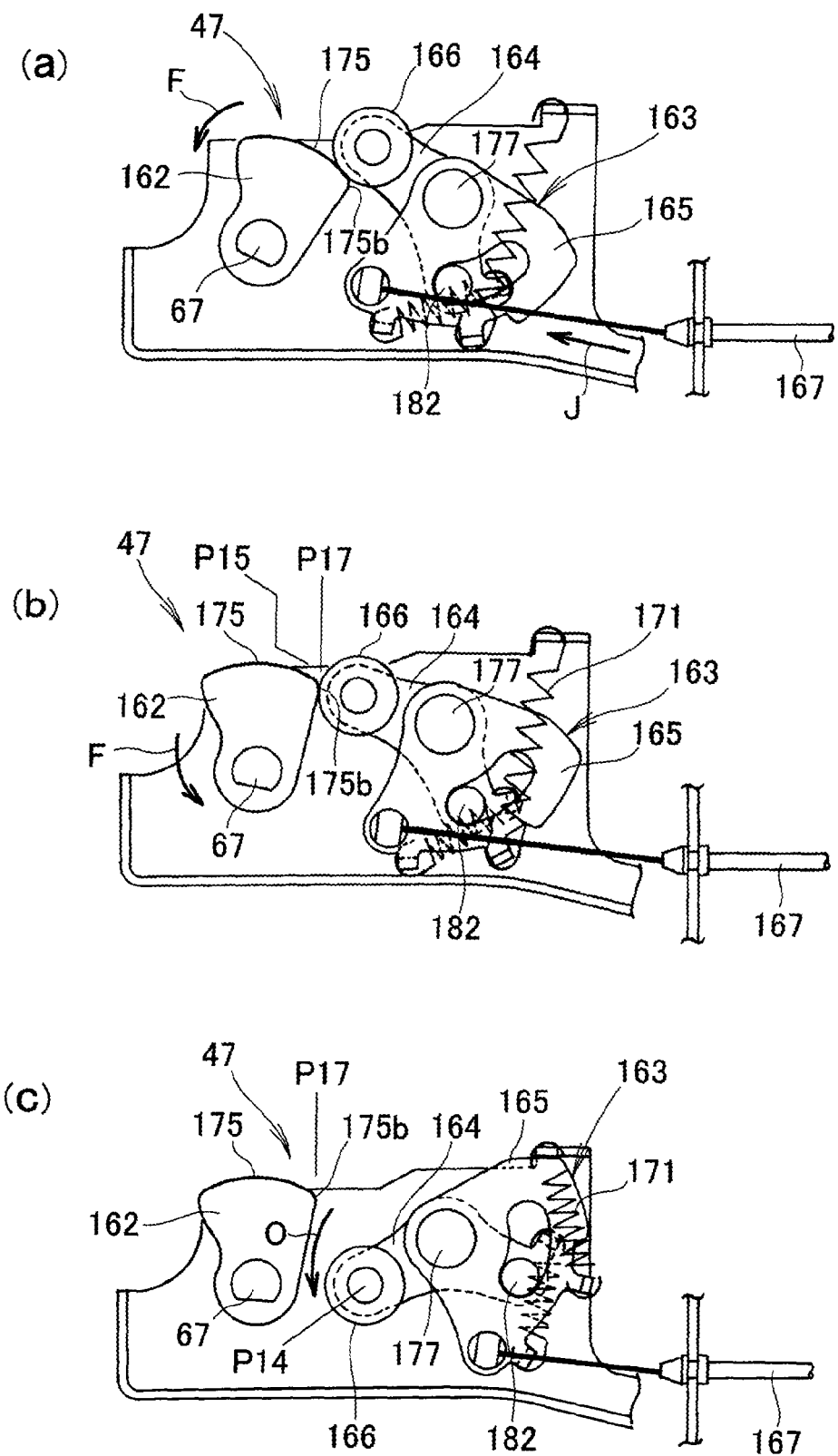
FIGS. 27(a), 27(b), and 27(c) are views showing that a release member of the linkage shown in FIG. 18 is returned to a release initial position.

The linkage 47 includes a release return spring member 171 for returning the release member 163 from a release position P15 (FIG. 27(b)) to a release initial position P14, and a hammer return spring member 172 for returning the hammer member 162 from a hammer inverted position P17 (FIG. 27(b)) to a hammer initial position P16.

The linkage bracket 161 includes an attachment base portion 161a disposed between the seat cushion 24 (FIG. 16) and the left front support bracket 53 on the left side of the vehicle body floor 12 (the rear part 12a), and a support section 161b rising from the attachment base portion 161a. The inner end portion 67a of the left, first rotation support shaft 67 is rotatably supported by a front end portion 161c of the support section 161b. The hammer member 162 has a base portion 162a disposed integrally with the left, first rotation support shaft 67.

The hammer member 162 includes a cam surface 174 adapted to abut on a roller 166 of the release member 163. The cam surface 174 is a surface formed to abut on the roller 166 of the release member 163 during the upward turning of the seat cushion 24 (FIG. 16), thereby causing the release member 163 to operate the linkage cable 167. The cam surface 174 has an abutment portion 175 adapted to abut on the roller 166 of the release member 163 until the seatback 27 moves past the second rising position P9 (FIG. 16). The abutment portion 175 is defined by a region from a starting point 175a to a terminal point 175b.

The release member 163 includes first and second release members 164, 165 rotatably supported by a substantially longitudinal center 161d of the support section 161b via a release shaft 177, and the roller 166 disposed on the first release member 164.

The first release member 164 includes a central portion 164a raised to have a dogleg-like shape, and the central portion 164a is rotatably supported by the release shaft 177. The first release member 164 includes a front end portion 164b carrying a roller pin 181, and a rear end portion 164c carrying a guide pin 182. The roller 166 is rotatably supported by the roller pin 181. The guide pin 182 fits in a guide hole 184 of the second release member 165.

The second release member 165 includes a central portion 165a protruding to have a sector-like shape, and the central portion 165a and the first release member 164 are rotatably supported by the release shaft 177. The second release member 165 includes a generally sector-shaped, curved portion 165b along which the guide hole 184 is formed. The second release member 165 also includes a lower end portion 165c carrying a cable pin 185. The guide pin 182 of the first release member 164 movably fits in the guide hole 184. The cable pin 185 is connected to a proximal end portion 167a of the linkage cable 167.

As shown in FIG. 16, the linkage cable 167 has the proximal end portion 167a (FIG. 17) connected to the cable pin 185, and an intermediate portion 167b at which the linkage cable 167 bifurcates into the seatback operating cable 145 and the headrest operating cable 156. The seatback operating cable 145 has the distal end portion 145a connected to the connection pin 144 of the seatback locking mechanism 45, as shown in FIG. 14. The headrest operating cable 156 has the distal end portion 156a connected to the operating bar 154 of the headrest locking means 151, as shown in FIG. 15.

As shown in FIG. 16, the linkage cable 167 is pulled in a direction of an arrow, thereby pulling the seatback operating cable 145 in a direction of an arrow and the headrest operating cable 156 in a direction of an arrow. The pull on the seatback operating cable 145 and the headrest operating cable 156 operates the seatback locking mechanism 45 and the headrest locking means 151 together with the linkage 47.

It is noted that the linkage cable 167 bifurcates into the seatback operating cable 145 and the headrest operating cable 156 at the intermediate portion 167b in a generally known technique.

As shown in FIG. 17 and FIG. 18, the release return spring member 171 is a spring to return the release member from the release position P15 (FIG. 27(b)) to the release initial position P14. This release return spring member 171 includes an upper hook portion 171a locked by an upper piece 161e of the support section 161b, and a lower hook portion 171b locked by a curved portion of a lug 165d of the second release member 165. The lug 165d protrudes rearwardly from the curved portion 165b.

The second release member 165 is urged by the release return spring member 171 to turn on the release shaft 177 in a direction of an arrow (a counterclockwise direction), such that an upper end portion 165e of the second release member 165 abuts on the upper piece 161e of the support section 161b.

The hammer return spring member 172 is a spring to return the hammer member 162 from the hammer inverted position P17 (FIG. 27(b)) to the hammer initial position P16. The hammer return spring member 172 includes an upper hook portion 172a locked by a rear locking end portion 164d of the first release member 164, and a lower hook portion 172b locked by a lower locking end portion 165f of the second release member 165.

The first release member 164 is urged by the hammer return spring member 172 to turn on the release shaft 177 in a direction of an arrow (a clockwise direction). As a result, the guide pin 182 of the first release member 164 abuts on a lower end portion 184a of the guide hole 184.

The abutment of the upper end portion 165e of the second release member 165 on the upper piece 161e and the abutment of the guide pin 182 of the first release member 164 on the lower end portion 184a of the guide hole 184 hold the first release member 164 in the release initial position P14.

As shown in FIG. 16 and FIG. 17, the linkage 47 is constructed such that the hammer member 162 rotates together with the left, first rotation support shaft 67 to abut on the roller 166 of the first release member 164. The hammer member 162 moves the first and second release members 164, 165 to pull the linkage cable 167 in a direction of an arrow. The pull on the linkage cable 167 holds the headrest locking means 151 and the seatback locking mechanism 45 in an unlocked state.

By holding the seatback locking mechanism 45 in the unlocked state, the seatback 27 is put into the released state in which the seatback 27 is not held by the seatback locking mechanism 45. When the seatback 27 is forwardly folded from the first rising position P8 to the forward folded position P10 (FIG. 28(b)), the linkage 47 is operable to keep the seatback 27 from being held by the seatback locking mechanism 45 until the seatback 27 moves past the second rising position P9.

By holding the headrest locking means 151 in the unlocked state, the headrest 31 is put into the released state in which the headrest 31 is not held by the headrest locking means 151.

The linkage 47 includes the hammer member 162, the release member 163, and the linkage cable 167. That is, the linkage 47 is formed by the smaller number of parts, the hammer member 162, the release member 163 and the linkage cable 167, the linkage 47 is small-sized (compact).

Since the left, first rotation support shaft 67 is disposed at the lower end portion 55a of the left side link 55 and the hammer member 162 is disposed integrally with the left, first rotation support shaft 67, upward turning of the seat cushion 24 causes the hammer member 162 to rotate together with the left, first rotation support shaft 67 to thereby abut on the roller 166 of the release member 163. By abutting on the roller 166 of the release member 163, the hammer member 162 moves the release member 163 to operate the linkage cable 167.

Since the rotation of the left, first rotation support shaft 67 is used to operate the linkage cable 167 when the seat cushion 24 turns upwardly, it is not necessary to use a change in position of the seat cushion 24 for operating the linkage cable 167. As a result, the seat cushion 24 can be disposed in the upward turned position conforming to a space of the passenger compartment 15, thereby enhancing convenience of the seat cushion 24.

The hammer member 162 includes the cam surface 174 having the abutment portion 175 adapted to abut on the release member 163 until the seatback 27 moves past the second rising position P9. Since the abutment portion 175 to abut on the release member 163 is formed on the cam surface 174, the cam surface 174 can easily set an abutment range over which the abutment portion 175 abuts on the release member 163. That is, the design is facilitated and the linkage can be compact.

Next, discussion will be made with reference to FIG. 19 to FIG. 28 as to "double fall-down" operation, i.e., an operation of folding the left rear seat 21 with the tailgate 16 at the rear part of the vehicle 10 being opened. As shown in FIG. 19(a), the tailgate 16 at the rear part of the vehicle 10 is opened to open the rear opening 17. With the rear opening 17 being opened, the operational lever 93 is manipulated from the side of the luggage compartment 23 (FIG. 19(b)).

As shown in FIG. 19(b), the operational lever 93 is manipulated from the side of the luggage compartment 23 to move from the ready position P4 to the operating position P5 in a direction of an arrow A. The movement of the operational lever 93 in the direction of the arrow A pulls the first operating cable 95 in a direction of an arrow B.

Figure 20:
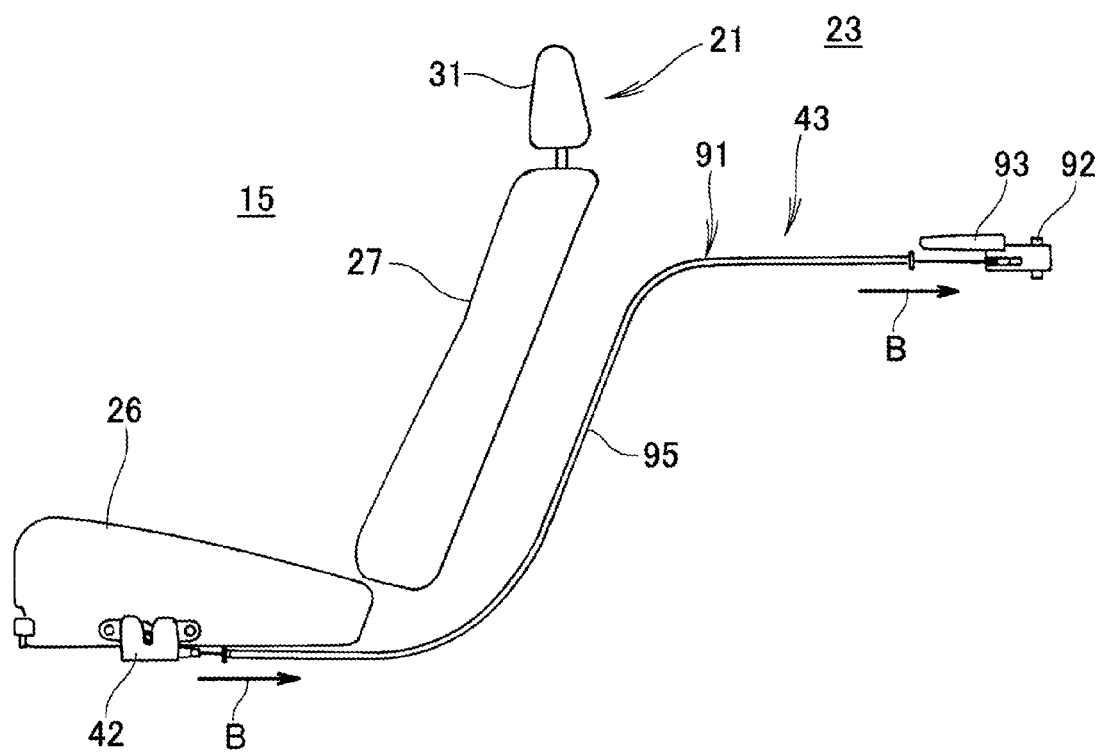
FIG. 20 is a view showing that a first operational cable is pulled by the operational lever shown in FIG. 19.
Figure 21:
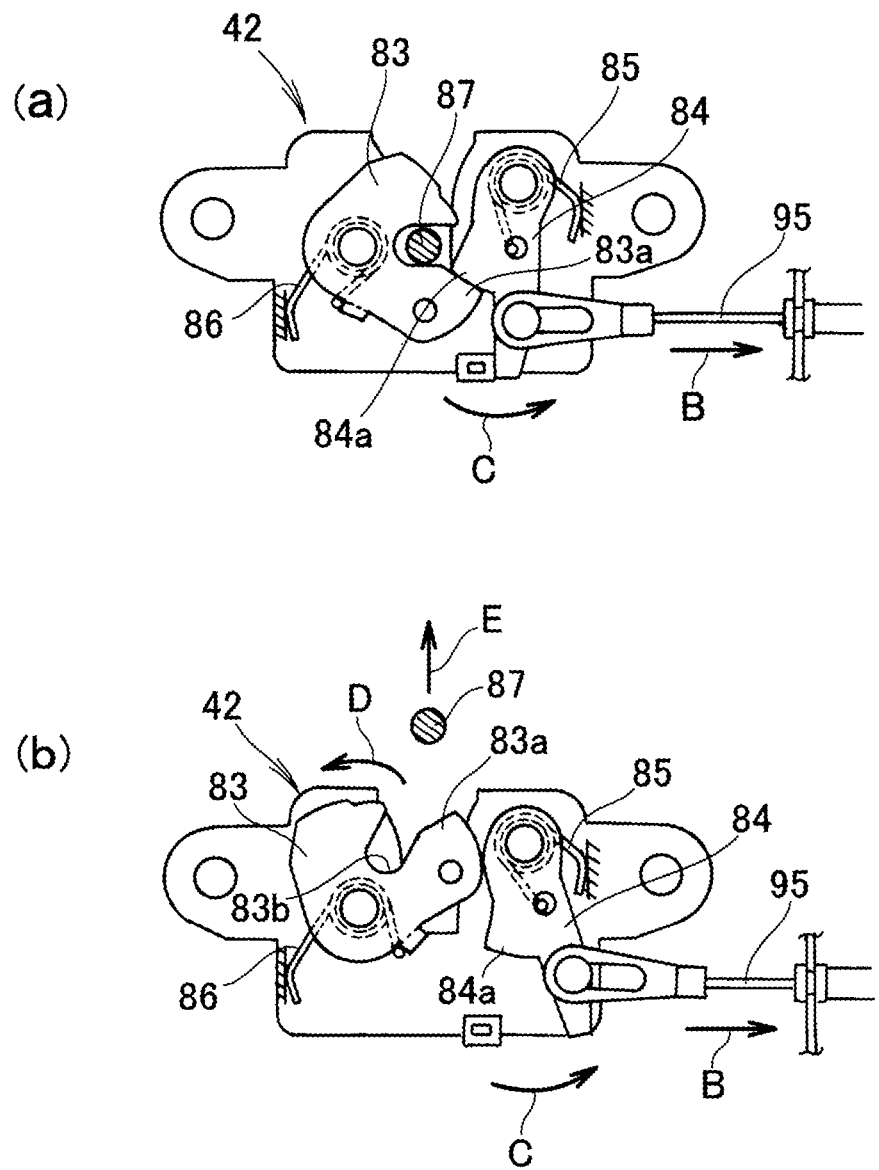
FIGS. 21(a) and 21(b) are views showing that the seat cushion locking mechanism is unlocked by the first operational cable shown in FIG. 20.

As shown in FIG. 20, by pulling the first operating cable 95 in the direction of the arrow B, the ratchet 84 (FIG. 21(a)) of the seat cushion locking mechanism 42 is pulled by the pulled first operating cable 95.

As shown in FIG. 21(a), the ratchet 84 moves (pivots) in a direction of an arrow C against the urging force of the ratchet spring member 85. The movement of the ratchet 84 releases the locking tooth 84a of the ratchet 84 from the locking portion 83a of the latch 83.

As shown in FIG. 21(b), the release of the locking tooth 84a from the locking portion 83a allows the latch 83 to rotate in a direction of an arrow D under the urging force of the latch spring member 86. The rotation of the latch 83 allows the seat cushion striker 87 to move in a direction of an arrow E out of the locking groove 83b of the latch 83 under the urging force of the spring member 61 (FIG. 22(a))

As shown in FIG. 22(a), the spring member 61 makes the left and right side links 55, 56 rotate in a direction of an arrow F on the left and right, first rotation support shafts 67, 75. Together with the left and right side links 55, 56, the guide link 57 (the left and right side rods 71c, 71d) rotates on the left and right, first guide support shafts 71a, 71b.

As shown in FIG. 22(b), the rotation of the left and right side links 55, 56 and the left and right side rods 71c, 71d turns the seat cushion 24 upwardly from the seating position P1 (FIG. 22(a)) toward the stowed position P2 (FIG. 28(a)), as indicated by an arrow G.

Since the left and right side links 55, 56 support the seat cushion 24 when the seat cushion 24 is turned upwardly, the guide link 57 can hold the upwardly turned posture of the seat cushion 24 in a preferred manner. In other words, the left and right side links 55, 56 need not serve to hold the seat cushion 24 in the upwardly turned posture. As a result, it becomes possible to restrain rigidity of the left and right side links 55, 56, and thereby downsize the left and right side links 55, 56.

As shown in FIG. 23(a), by rotation of the left, first rotation support shaft 67 in a direction of an arrow F, the hammer member 162 rotates from the hammer initial position P16 in the direction of the arrow F, together with the left, first rotation support shaft 67.

As shown in FIG. 23(b), the rotation of the hammer member 162 in the direction of the arrow F causes the cam surface 174 (the abutment portion 175) of the hammer member 162 to abut on the roller 166 of the first release member 164 from below. More specifically, the starting point 175a (FIG. 23(a)) of the abutment portion 175 of the cam surface 174 abuts on the roller 166 of the first release member 164 from below.

As shown in FIG. 23(c), with the hammer member 162 abutting on the roller 166, the hammer member 162 continues to rotate in the direction of the arrow F. The continuous rotation of the hammer member 162 in the direction of the arrow F causes the first release member 164 to rotate on the release shaft 177 in a direction of an arrow H.

The rotation of the first release member 164 moves the guide pin 182 in a direction of an arrow I, such that the moving guide pin 182 rotates the second release member 165 on the release shaft 177 in the direction of the arrow I. The rotation of the second release member 165 pulls the linkage cable 167 in a direction of an arrow J.

Figure 24:
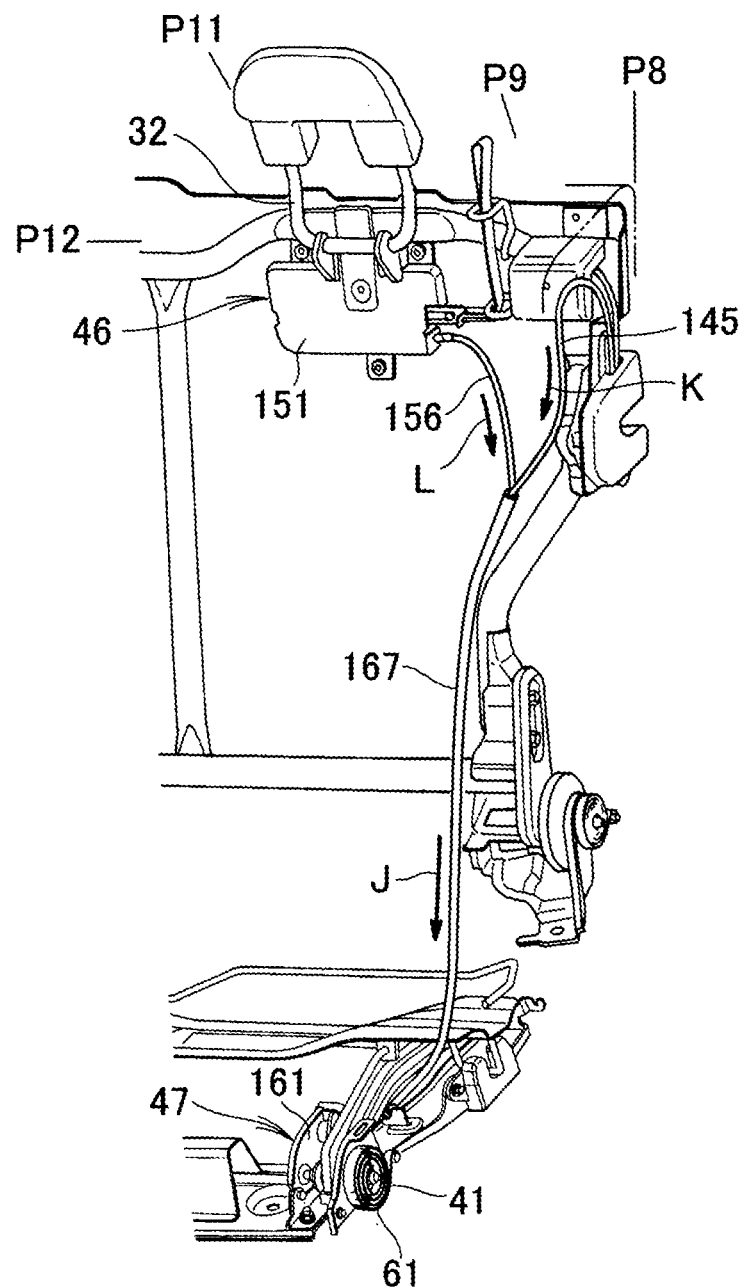
FIG. 24 is a view showing that the linkage shown in FIG. 23 operates a seatback operating cable and a headrest operating cable.
Figure 25:
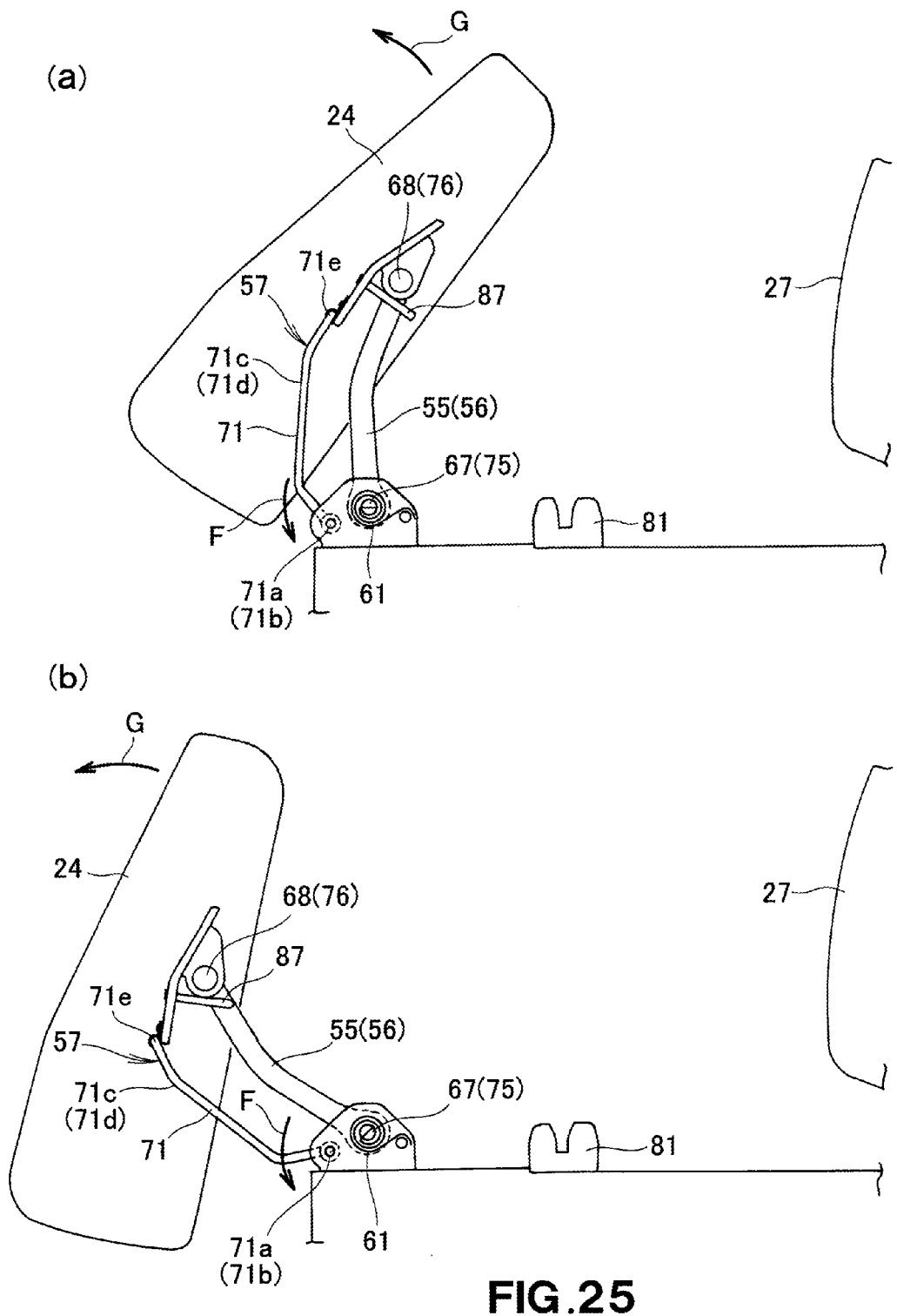
FIGS. 25(a) and 25(b) are views showing that the seat cushion shown in FIG. 22 is turned upwardly to a position immediately before a stowed position.

As shown in FIG. 24, by pulling the linkage cable 167, the seatback operating cable 145 is pulled in a direction of an arrow K and the headrest operating cable 156 is pulled in a direction of an arrow L.

As shown in FIG. 25(a), the left and right, first rotation support shafts 67, 75 rotate in the direction of the arrow F to thereby turn the seat cushion 24 upwardly toward the stowed position P2 (FIG. 28(a)), as indicated by an arrow G.

As shown in FIG. 25(b), the seat cushion 24 is continuously turned upwardly to a position just before the stowed position P2 (FIG. 28(a)).

With the seat cushion 24 being turned to the position just before the stowed position P2 (FIG. 28(a)), the operating bar 154 of the headrest locking means 151 shown in FIG. 15 moves to thereby release the pair of second locking pieces 153 from the locking grooves 152a. As a result, the headrest 31 is put into the released state in which the headrest 31 is not held in the upright position P11. That is, the headrest locking means 151 is unlocked.

Figure 26:
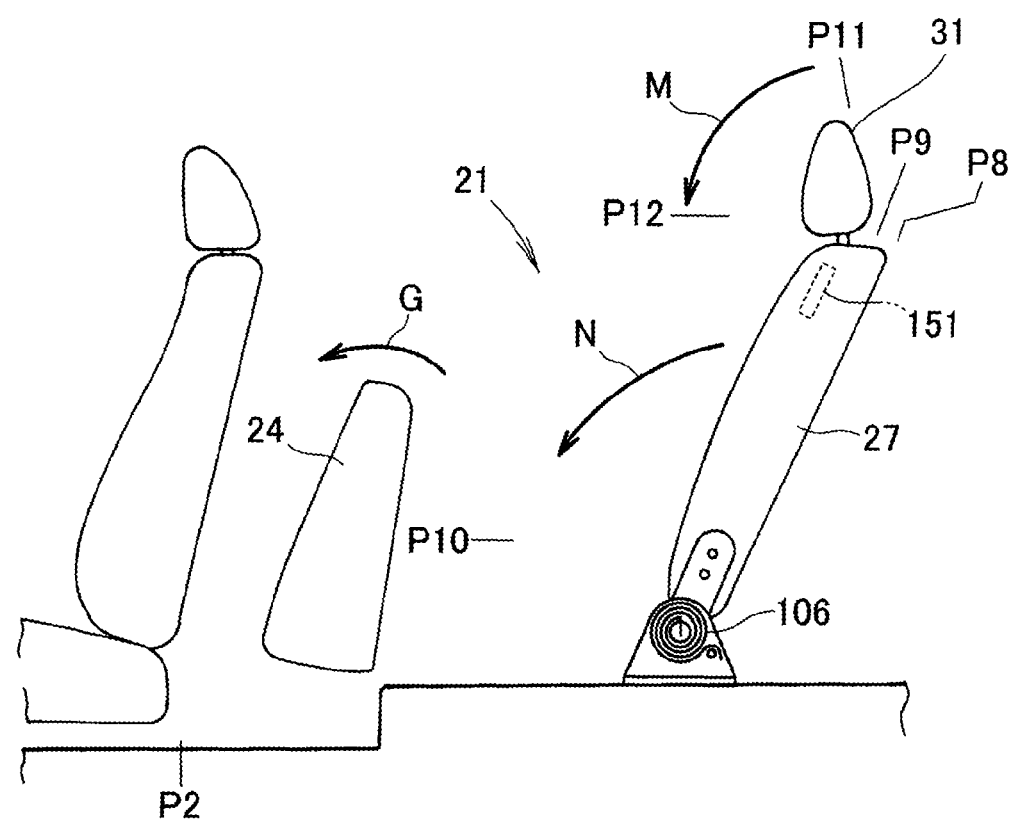
FIG. 26 is a view showing that a seatback is about to be folded forwardly.

As shown in FIG. 26, with the headrest locking means 151 being unlocked, the headrest 31 is forwardly folded from the upright position P11 to the forward folded position P12 under the urging force of the forward folding spring member.

When the seat cushion 24 is turned upwardly to the position just before the stowed position P2 (FIG. 28(a)), the latch 142 of the seatback locking mechanism 45 shown in FIG. 13 rotates to thereby release the first locking groove 142a from the first locking portion 137a and release the second locking groove 142b from the second locking portion 137b. As a result, the seatback 27 is put into the released state in which the seatback 27 is not held in the first rising position P8. That is, the seatback locking mechanism 45 is unlocked.

As shown in FIG. 26, by unlocking the seatback locking mechanism 45, the seatback 27 is forwardly folded from the first rising position P8 though the second rising position P9 to the forward folded position P10 under the urging force of the spring member 106, as indicated by an arrow N.

As shown in FIG. 27(a), immediately before the seat cushion 24 reaches the stowed position P2 (FIG. 26), the abutment portion 175 abuts on the roller 166 close to the terminal point 175b. During the abutment of the abutment portion 175 on the roller 166, the seatback 27 shown in FIG. 26 moves beyond the second rising position P9.

As shown in FIG. 27(b), the roller 166 arrives at the terminal point 175b of the abutment portion 175. As the roller 166 arrives at the terminal point 175b of the abutment portion 175, the hammer member 162 continues to rotate in the direction of the arrow F so as to reach the hammer inverted position P17. As a result, the roller 166 moves away from the terminal point 175b of the abutment portion 175.

As shown in FIG. 27(c), since the roller 166 moves away from the terminal point 175b of the abutment portion 175, the release member 163 (the first and second release members 164, 165) rotates on the release shaft 177 in a direction of an arrow O under the urging force of the release return spring member 171. By thus rotating under the urging force of the release return spring member 171, the release member 163 is returned from the release position P15 (FIG. 27(b)) to the release initial position P14.

As shown in FIG. 28(a), as the hammer member 162 rotates to the hammer inverted position P17 (FIG. 27), the seat cushion 24 reaches the stowed position P2.

As shown in FIG. 28(b), after the seat cushion 24 is located in the stowed position P2, the seatback 27 moves past the second rising position P9 to the forward folded position P10. This completes a "one motion double fall-down" operation, that is, an operation of folding the left rear seat 21 by moving the seat cushion 24 to the stowed position P2 as well as moving the seatback 27 to the forward folded position P10.

As shown in FIG. 28(a), with the seat cushion 24 being disposed in the stowed position P2, the left side link 55 and the guide link 57 (the left side rod 71c) overlap vertically and the right side link 56 and the guide link 57 (the right side rod 71*d*) overlap vertically. Thus, with the seat cushion 24 being disposed in the stowed position P2, the link mechanism 51 is difficult to view, whereby the left rear seat 21 can be look better.

As discussed in relation to FIG. 19 to FIG. 28, the linkage 47 is operable to allow the seatback locking mechanism 45 to release the seatback 27 without holding the seatback 27, until the seatback 27 moves beyond the second rising position P9. As a result, the seatback 27 forwardly folded from the first rising position P8 is prevented from being held in the second rising position P9 when the seatback 27 is folded in unison with upward turning of the seat cushion 24. That is, it becomes possible to ensure that the seatback 27 is forwardly folded in unison with the upward turning of the seat cushion 24. In other words, since the left rear seat 21 can be folded through only one operation, this folding operation can be facilitated.

Next, discussion will be made with reference to FIG. 29 to FIG. 34 as to an operation of returning the left rear seat 21 from the folded position to a usable position. As shown in FIG. 29(*a*), the left rear side door 18 at the lateral side of the vehicle 10 is opened to open the left side opening 19. A person brings his hand through the left side opening 19 into the passenger compartment 15 to turn the seatback 27 back from the forward folded position P10.

As shown in FIG. 29(*b*), the seatback 27 is turned back from the forward folded position P10 against the urging force of the spring member 106, as indicated by an arrow P.

As shown in FIG. 30(*a*), the seatback 27 is turned back to the second rising position P9, as indicated by the arrow P, against the urging force of the spring member 106. As a result of the turning of the seatback 27 back to the second rising position P9, a distal tooth 142*c* of the latch 142 shown in FIG. 14 abuts on the first locking portion 137*a*. Then, the distal tooth 142*c* of the latch 142 travels over the first locking portion 137*a*, causing the latch 142 to rotate on a latch pin 147 counterclockwise against the urging force of a latch spring (not shown).

By the traveling of the distal tooth 142*c* of the latch 142 beyond the first locking portion 137*a*, the first locking groove 142*a* comes into locking engagement with the second locking portion 137*b* to thereby hold the seatback 27 in the second rising position P9. The seatback 27 in the second rising position P9 serves as the backrest for a passenger sitting on the left rear seat 21.

As shown in FIG. 30(*b*), after the seatback 27 is turned back to the second rising position P9, the headrest 31 is turned upwardly from the forward folded position P12 to the upright position P11 against the urging force of the forward folding spring member (not shown), as indicated by an arrow Q. The upward turning of the headrest 31 to the upright position P11 brings the pair of second locking pieces 153 into locking engagement with the locking grooves 152*a* of the pair of first locking pieces 152. As a result, the headrest 31 is held in the upright position P11.

Figure 22:
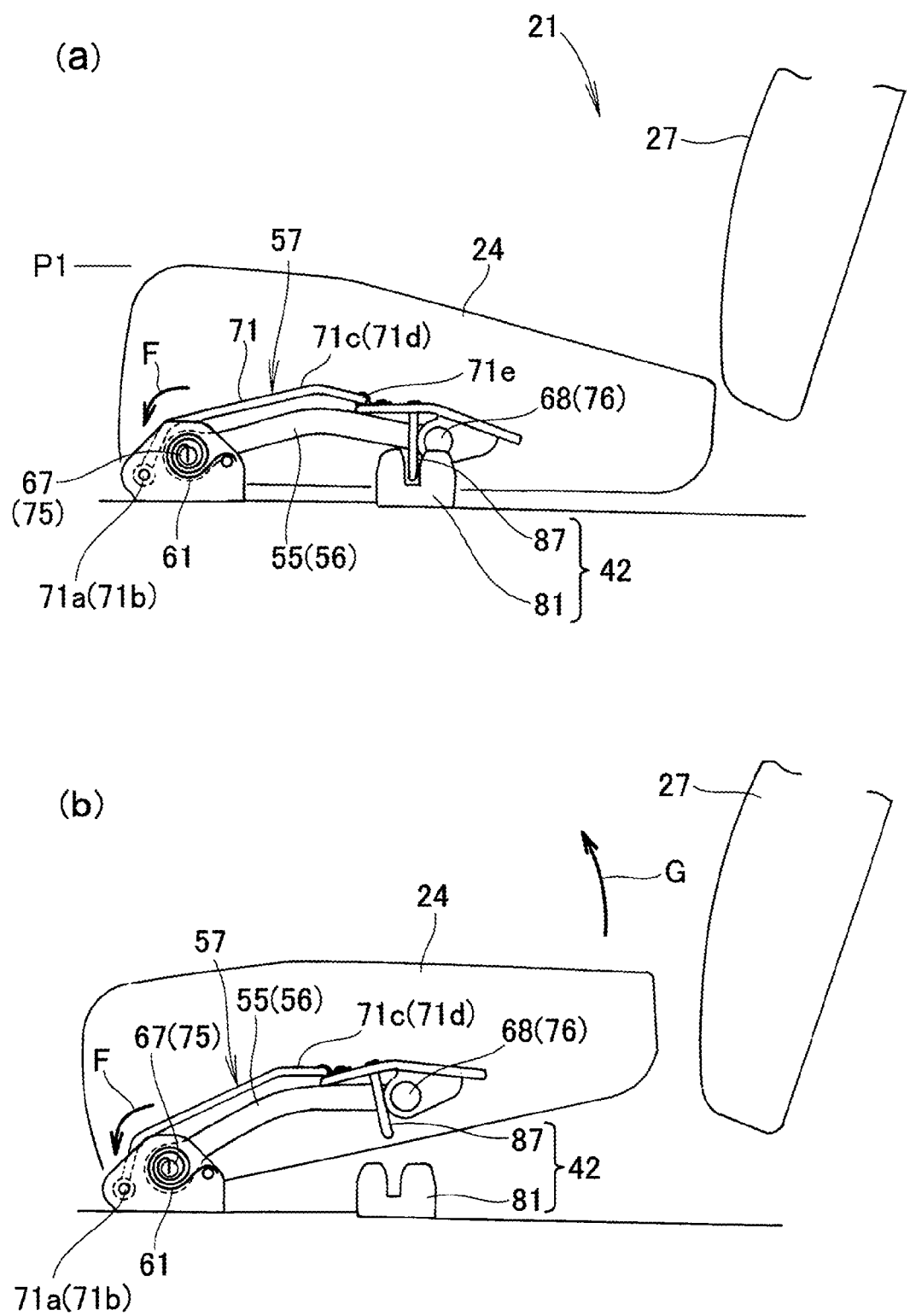
FIGS. 22(a) and 22(b) are views showing that a seat cushion is turned upwardly.
FIGS. 23(a), 23(b), and 22(c) are views showing operation of the linkage shown in FIG. 18.
Figure 23:
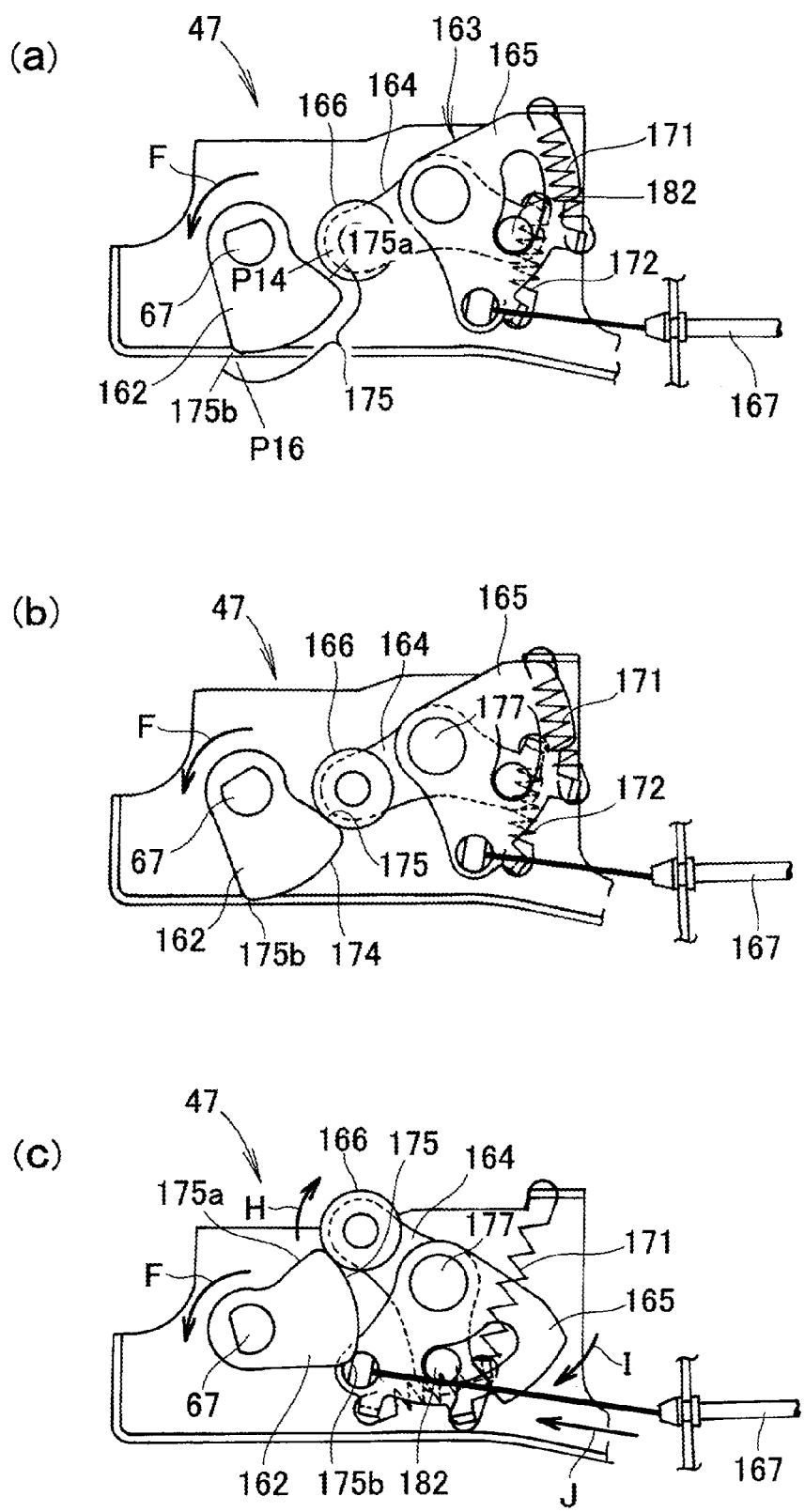
Figure 31:
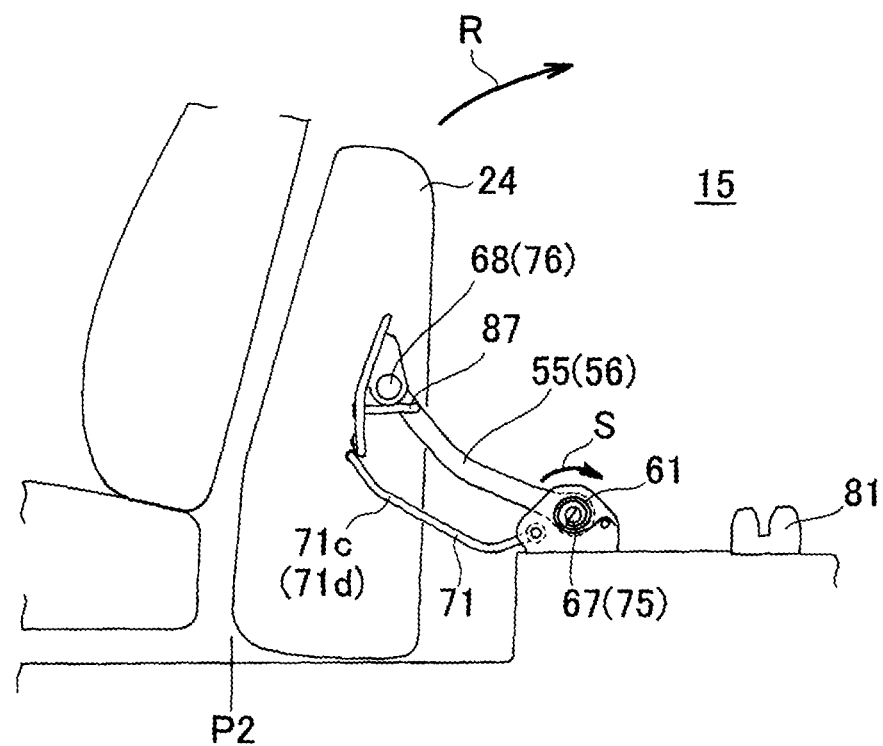
FIG. 31 is a view showing that a seat cushion shown in FIG. 29 is returned toward a seating position.

As shown in FIG. 31, the seat cushion 24 is returned from the stowed position P2 to the seating position P1 (FIG. 22(*a*)) against the urging force of the spring member 61, as indicated by an arrow R. By returning the seat cushion 24, as indicated by the arrow R, the left, first rotation support shaft 67 rotates in a direction of an arrow S.

Figure 32:
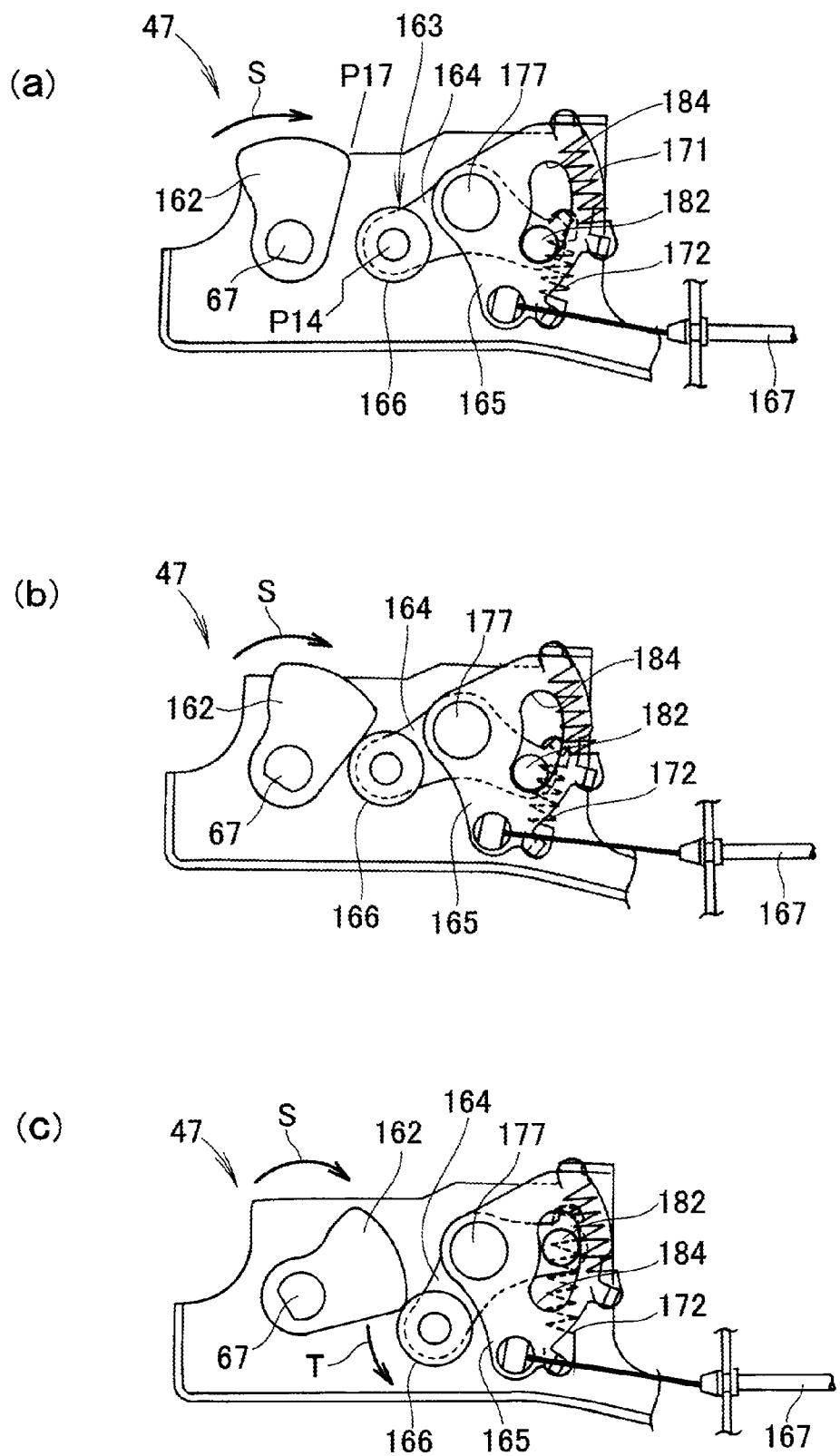
FIGS. 32(a), 32(b), and 32(c) are views showing that a hammer member is returned from a hammer inverted position to an intermediate position located before a hammer initial position.
Figure 34:
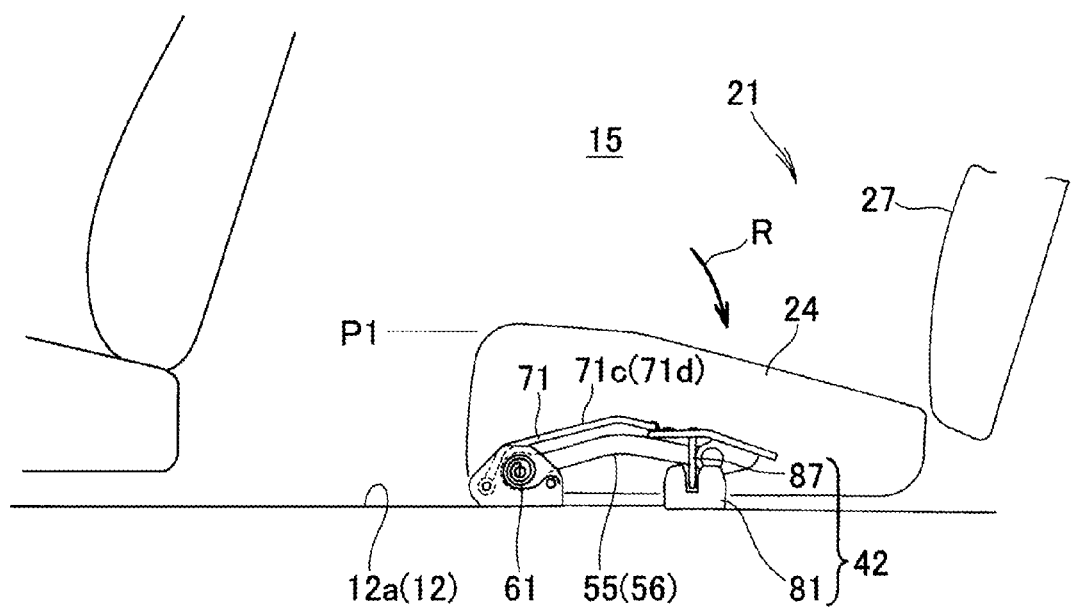
FIG. 34 is a view showing that the seat cushion shown in FIG. 31 is returned to the seating position.

As shown in FIG. 32(*a*), the rotation of the left, first rotation support shaft 67 in the direction of the arrow S causes the hammer member 162 to rotate together with the left, first rotation support shaft 67 in the direction of the arrow S to move from the hammer inverted position P17.

As shown in FIG. 32(*b*), the rotation of the hammer member 162 in the direction of the arrow S bring the hammer member 162 into abutment on the roller 166 of the first release member 164 from above.

As shown in FIG. 32(*c*), the hammer member 162 abutting on the roller 166 continues to rotate in the direction of the arrow S. The continuous rotation of the hammer member 162 in the direction of the arrow S causes the first release member 164 to rotate on the release shaft 177 in a direction of an arrow T against the urging force of the hammer return spring member 172.

At this time, the guide pin 182 of the first release member 164 lifts upwardly along the guide hole 184 of the second release member 165, thereby keeping the second release member 165 stationary.

As shown in FIG. 33(*a*), the continuous rotation of the hammer member 162 in the direction of the arrow S causes the starting point 175*a* of the abutment portion 175 to reach the roller 166.

As shown in FIG. 33(*b*), rotation of the hammer member 162 to the hammer initial position P16 causes the starting point 175*a* of the abutment portion 175 to move past the roller 166. The movement of the starting point 175*a* of the abutment portion 175 past the roller 166 causes the hammer member 162 to move away from the roller 166. The movement of the hammer member 162 away from the roller 166 allows the first release member 164 to rotate on the release shaft 177 in a direction of an arrow U under the urging force of the hammer return spring member 172 (FIG. 32). After rotating, the first release member 164 (i.e., the release member 163) is held in the release initial position P14. By thus holding the hammer member 162 in the hammer initial position P16 and holding the release member 163 in the release initial position P14, the linkage 47 is returned to an initial state.

With the linkage 47 being returned to the initial state, the seat cushion 24 is disposed in the seating position P1. Since the seat cushion 24 is disposed in the seating position P1, the seat cushion striker 87 is locked by the locking portion 81 to hold the seat cushion 24 in the seating position P1. This completes the operation of returning the folded left rear seat 21 to the usable position.

With the left rear seat 21 being returned to the usable position, as shown in FIG. 30(*a*), the seatback 27 is held in the second rising position P9 to serve as the backrest. To move the seatback 27 from the second rising position P9 to the first rising position (the reclining position) P8, the reclining operation portion 149*b* on the back side of the seatback 27 is operated.

That is, the operation of the reclining operation portion 149*b* (FIG. 11) on the back side of the seatback 27 manipulates the seatback operating cable 149*a* of the seatback locking mechanism 45. The manipulation of the seatback operating cable 149*a* actuates the latch 142 so as to hold the seatback 27 in the first rising position P8.

The vehicle seat according to the present invention is not limited to that discussed in the above embodiment, but may be appropriately changed or improved. For example, although the seatback 27 is folded forwardly from the first rising position P8 to the forward folded position P10 in folding the left rear seat 21, the seatback 27 may be folded forwardly from the second rising position P9 in folding the left rear seat 21.

It is noted that the vehicle 10, the vehicle body floor 12, the vehicle seat 20, the seat cushion 24, the seatback 27, the double fall-down structure 40, the movement mechanism 41, the forward folding mechanism 44, the link mechanism 51, the cross member 52, the left and right, first support brackets 53, 54, the left and right side links 55, 56, the guide link 57, the left, first rotation support shaft 67, the left and right, first guide support shaft 71a, 71b and the second guide support shaft 71e etc. have their shapes which are not limited to those discussed above but may be appropriately changed.

INDUSTRIAL APPLICABILITY

The present invention is suitable for use in an automobile including a vehicle seat having a seat cushion movable from a seating position to a stowed position, and a seatback foldable forwardly from a rising position to a forward folded position.

REFERENCE SIGNS LIST

10 . . . a vehicle, 12 . . . a vehicle body floor, 20 . . . a vehicle seat, 24 . . . a seat cushion, 24b . . . a bottom portion of the seat cushion, 27 . . . a seatback, 40 . . . a double fall-down structure, 41 . . . a movement mechanism, 44 . . . a forward folding mechanism, 51 . . . a link mechanism, 52 . . . a cross member, 53, 54 . . . left and right front support brackets (a support bracket), 55, 56 . . . left and right side links (a side link), 55a . . . a lower end portion (one end portion) of the left side link, 55b . . . an upper end portion (an opposite end portion) of the left side link, 57 . . . a guide link, 61 . . . a spring member (first urging member), 67 . . . a left, first guide support shaft (a rotation support shaft), 71a, 71b . . . left and right, first guide support shafts (first guide support shafts), 71e . . . a second guide support shaft, P1 . . . a seating position, P2 . . . a stowed position, P8 . . . a first rising position (a rising position), P9 . . . a second rising position (a rising position), P10 . . . a forward folded position

The invention claimed is:

1. A vehicle seat system including a seat cushion having a sidewall portion and a base portion, a movement mechanism for moving the seat cushion between a seating position and a stowed position located forwardly of the seating position, a seatback, and a forward folding mechanism for moving the seatback between a rising position and a forward folded position, wherein the movement mechanism moves the seat cushion independently of the seatback and comprises:

a cross member including a flat plate member disposed on a bottom portion of the seat cushion and extending laterally of the vehicle seat apparatus;

left and right front support brackets disposed forwardly of the cross member and on a vehicle body floor;

left and right side links having lower end portions rotatably connected to the left and right front support brackets through rotation support shafts, and upper end portions rotatably connected to the cross member; and a guide link comprising first left and right guide support shafts rotatably disposed at front portions of the left and right front support brackets, forwardly of the rotation support shafts, and a second guide support shaft rotatably disposed on the cross member located rearwardly of the first left and right guide support shafts, and wherein the left and right side links and guide link are configured to vertically overlap with the seat cushion when the seat cushion is disposed in the stowed position.

2. The vehicle seat system of claim 1, wherein one of the rotation support shafts is disposed on one of the left and right side links and has a first urging member for urging the seat cushion forwardly of a vehicle body.

3. The vehicle seat system of claim 1, wherein the guide link further comprises left and right side rods connected to the first left and right guide support shafts, the second guide support shaft interconnects upper end portions of the left and right side rods, and the guide link has a generally U-shaped configuration opened forwardly of the vehicle body, the generally U-shaped configuration being defined by the left and right side rods and the second guide support shaft, and wherein the guide link is configured to maintain a forwardly offset relationship to the left and right side links when the seat is in the upright position.

4. The vehicle seat system of claim 3, wherein the left and right side rods have lower ends rotatably supported by the left and right front support brackets.

5. The vehicle seat system of claim 1, further comprising a seat cushion locking mechanism for locking the seat cushion in the seating position, the seat cushion locking mechanism comprising a locking portion disposed on the sidewall of the seat cushion, and a seat cushion striker engageable with the locking portion, the seat cushion striker being disposed on the bottom portion of the seat cushion via the flat plate member of the cross member.

* * * * *